(12) United States Patent
Smith

(10) Patent No.: US 9,180,934 B2
(45) Date of Patent: Nov. 10, 2015

(54) HULL CLEANING ROBOT

(71) Applicant: Raytheon Company, Waltham, MA (US)

(72) Inventor: Fraser M. Smith, Salt Lake City, UT (US)

(73) Assignee: Raytheon Company, Waltham, MA (US)

( * ) Notice: Subject to any disclaimer, the term of this patent is extended or adjusted under 35 U.S.C. 154(b) by 114 days.

(21) Appl. No.: 13/769,344

(22) Filed: Feb. 17, 2013

(65) Prior Publication Data

US 2014/0076226 A1    Mar. 20, 2014

Related U.S. Application Data

(60) Provisional application No. 61/701,512, filed on Sep. 14, 2012, provisional application No. 61/701,517, filed on Sep. 14, 2012, provisional application No. 61/701,523, filed on Sep. 14, 2012, provisional application No. 61/701,529, filed on Sep. 14, 2012, provisional application No. 61/701,534, filed on Sep. 14, 2012, provisional application No. 61/701,537, filed on Sep. 14, 2012.

(51) Int. Cl.
| | |
|---|---|
| *B63B 17/00* | (2006.01) |
| *B63B 59/06* | (2006.01) |
| *B63B 59/10* | (2006.01) |
| *B63B 9/00* | (2006.01) |
| *B63B 59/08* | (2006.01) |
| *B62D 55/265* | (2006.01) |

(Continued)

(52) U.S. Cl.
CPC .............. *B63B 17/00* (2013.01); *B62D 55/265* (2013.01); *B62D 55/32* (2013.01); *B63B 9/00* (2013.01); *B63B 59/06* (2013.01); *B63B 59/08* (2013.01); *B63B 59/10* (2013.01); *B63G 8/001* (2013.01); *G05D 1/00* (2013.01); *G05D 1/021* (2013.01); *G05D 2201/0203* (2013.01); *Y10S 901/01* (2013.01); *Y10S 901/41* (2013.01); *Y10S 901/44* (2013.01)

(58) Field of Classification Search
CPC .......... B08B 7/00; B08B 1/008; B08B 17/00; B63B 59/00; B63B 59/06; G05D 1/00; B63G 8/001
USPC .......................... 114/222; 134/1, 6, 18; 15/1.7
See application file for complete search history.

(56) References Cited

U.S. PATENT DOCUMENTS

| | | | |
|---|---|---|---|
| 2,104,062 | A | 1/1938 | Temple |
| 2,132,661 | A | 10/1938 | Temple |

(Continued)

FOREIGN PATENT DOCUMENTS

| | | |
|---|---|---|
| CN | 2405719 | 11/2000 |
| CN | 2552648 | 5/2003 |

(Continued)

OTHER PUBLICATIONS

U.S. Appl. No. 12/313,643, filed Nov. 21, 2008; James H. Rooney III; office action dated Aug. 25, 2014.

(Continued)

*Primary Examiner* — Lars A Olson

(57) ABSTRACT

A hull cleaning robot, in accordance with an embodiment of the present technology, includes a robot body and a drive module within the robot body for maneuvering the robot about a hull. The drive module includes a drive element for holding the robot on the hull as the robot maneuvers about the hull. The drive element includes a cleaning function for cleaning the hull of a vessel.

55 Claims, 16 Drawing Sheets

(51) Int. Cl.
    *B62D 55/32*      (2006.01)
    *B63G 8/00*      (2006.01)
    *G05D 1/00*      (2006.01)
    *G05D 1/02*      (2006.01)

(56) References Cited

U.S. PATENT DOCUMENTS

| | | | |
|---|---|---|---|
| 2,386,650 A | 10/1945 | Bell | |
| 3,058,783 A | 10/1962 | Wadsworth et al. | |
| 3,088,429 A | 5/1963 | Johannessen | |
| 3,285,676 A | 11/1966 | Hetteen | |
| 3,439,937 A | 4/1969 | Dixon | |
| 3,554,300 A | 1/1971 | Rosenberg | |
| 3,638,600 A | 2/1972 | Modrey | |
| 3,682,265 A | 8/1972 | Hiraoka et al. | |
| 3,750,129 A | 7/1973 | Takeno et al. | |
| 3,777,834 A | 12/1973 | Hiraoka et al. | |
| 3,906,572 A | 9/1975 | Winn | |
| 3,922,991 A | 12/1975 | Woods | |
| 3,934,664 A | 1/1976 | Pohjola | |
| 3,946,692 A | 3/1976 | Sierra et al. | |
| 3,960,229 A | 6/1976 | Shio | |
| 3,984,944 A | 10/1976 | Maasberg et al. | |
| 4,046,429 A | 9/1977 | Pohjola | |
| 4,079,694 A | 3/1978 | Galinou | |
| 4,119,356 A | 10/1978 | Pohjola | |
| 4,135,492 A | 1/1979 | Heitland | |
| 4,135,592 A | 1/1979 | Wincent | |
| 4,202,453 A | 5/1980 | Wilkes | |
| 4,251,791 A | 2/1981 | Yanagisawa et al. | |
| 4,401,048 A | 8/1983 | Rogers | |
| 4,444,146 A | 4/1984 | DeWitz et al. | |
| 4,574,722 A | 3/1986 | Orita et al. | |
| 4,674,949 A | 6/1987 | Kroczynski | |
| 4,690,092 A | 9/1987 | Rabuse | |
| 4,697,536 A | 10/1987 | Hirata | |
| 4,697,537 A | 10/1987 | Smith | |
| 4,734,954 A | 4/1988 | Greskovics et al. | |
| 4,736,826 A | 4/1988 | White et al. | |
| 4,788,498 A | 11/1988 | Uemura | |
| 4,789,037 A | 12/1988 | Kneebone | |
| 4,809,383 A | 3/1989 | Urakami | |
| 4,841,894 A | 6/1989 | Nellessen, Jr. | |
| 4,890,567 A | 1/1990 | Caduff | |
| 4,926,775 A | 5/1990 | Andorsen | |
| 5,048,445 A | 9/1991 | Lever et al. | |
| 5,174,222 A | 12/1992 | Rogers | |
| 5,203,646 A | 4/1993 | Landsberger et al. | |
| 5,249,631 A | 10/1993 | Ferren | |
| 5,253,605 A | 10/1993 | Collins | |
| 5,253,724 A | 10/1993 | Prior | |
| 5,285,601 A | 2/1994 | Watkin et al. | |
| 5,337,434 A * | 8/1994 | Erlich | 15/1.7 |
| 5,366,038 A | 11/1994 | Hidetsugu et al. | |
| 5,378,994 A | 1/1995 | Novak et al. | |
| 5,435,405 A | 7/1995 | Schempf et al. | |
| 5,569,371 A | 10/1996 | Perling | |
| 5,628,271 A | 5/1997 | McGuire | |
| 5,831,432 A | 11/1998 | Mohri | |
| 5,849,099 A | 12/1998 | McGuire | |
| 5,852,984 A | 12/1998 | Matsuyama et al. | |
| 5,884,642 A | 3/1999 | Broadbent | |
| 5,894,901 A | 4/1999 | Awamura et al. | |
| 5,947,051 A | 9/1999 | Geiger | |
| 6,000,484 A | 12/1999 | Zoretich et al. | |
| 6,053,267 A | 4/2000 | Fisher | |
| 6,064,708 A | 5/2000 | Sakamaki | |
| 6,102,145 A | 8/2000 | Fisher | |
| 6,125,955 A | 10/2000 | Zoretich et al. | |
| 6,209,473 B1 | 4/2001 | Jones et al. | |
| 6,276,478 B1 | 8/2001 | Hopkins et al. | |
| 6,317,387 B1 | 11/2001 | D'Amaddio et al. | |
| 6,564,815 B2 | 5/2003 | McGuire | |
| 6,595,152 B2 | 7/2003 | McGuire | |
| 6,698,375 B2 | 3/2004 | Delfosse | |
| 6,698,376 B2 | 3/2004 | Delahousse et al. | |
| 6,792,335 B2 | 9/2004 | Ross et al. | |
| 6,886,486 B2 | 5/2005 | Van Rompay | |
| 6,886,651 B1 | 5/2005 | Slocum et al. | |
| 6,974,356 B2 | 12/2005 | Hobson | |
| 7,286,214 B2 | 10/2007 | Reinersman et al. | |
| 7,290,496 B2 | 11/2007 | Asfar et al. | |
| 7,296,530 B1 | 11/2007 | Bemstein et al. | |
| 7,390,560 B2 | 6/2008 | Wallach | |
| 7,496,226 B2 | 2/2009 | Negahdaripour et al. | |
| 7,520,356 B2 | 4/2009 | Sadegh et al. | |
| 7,866,421 B2 | 1/2011 | Moore et al. | |
| 7,934,575 B2 | 5/2011 | Waibel et al. | |
| 8,109,383 B1 | 2/2012 | Suderman et al. | |
| 8,214,081 B2 | 7/2012 | Choi et al. | |
| 8,342,281 B2 | 1/2013 | Rooney, III | |
| 8,386,112 B2 | 2/2013 | Rooney, III | |
| 8,393,286 B2 | 3/2013 | Rooney, III et al. | |
| 8,393,421 B2 | 3/2013 | Kornstein et al. | |
| 8,506,719 B2 * | 8/2013 | Holappa et al. | 114/222 |
| 8,723,536 B2 | 5/2014 | Miyazaki et al. | |
| 8,985,250 B1 | 3/2015 | Lussier et al. | |
| 2003/0000445 A1 | 1/2003 | McGuire | |
| 2004/0089216 A1 | 5/2004 | Van Rompay | |
| 2004/0133999 A1 | 7/2004 | Walton | |
| 2004/0250934 A1 | 12/2004 | Hamdan | |
| 2005/0027412 A1 | 2/2005 | Hobson et al. | |
| 2005/0156562 A1 | 7/2005 | Cohen et al. | |
| 2005/0199171 A1 | 9/2005 | Ecklund | |
| 2005/0216125 A1 | 9/2005 | Huston et al. | |
| 2006/0175439 A1 | 8/2006 | Steur et al. | |
| 2006/0191457 A1 | 8/2006 | Murphy | |
| 2006/0249622 A1 | 11/2006 | Steele | |
| 2006/0261772 A1 | 11/2006 | Kim | |
| 2007/0089916 A1 | 4/2007 | Lundstrom | |
| 2007/0276552 A1 | 11/2007 | Rodocker et al. | |
| 2007/0284940 A1 | 12/2007 | Koolhiran | |
| 2008/0009984 A1 | 1/2008 | Lee et al. | |
| 2008/0202405 A1 | 8/2008 | Kern | |
| 2008/0276407 A1 | 11/2008 | Schnittman | |
| 2008/0281470 A1 | 11/2008 | Gilbert et al. | |
| 2008/0300821 A1 | 12/2008 | Frank et al. | |
| 2008/0308324 A1 | 12/2008 | Moser et al. | |
| 2009/0078484 A1 | 3/2009 | Kocijan | |
| 2009/0094765 A1 | 4/2009 | Osaka et al. | |
| 2009/0166102 A1 | 7/2009 | Waibel et al. | |
| 2009/0301203 A1 | 12/2009 | Brussieux | |
| 2010/0000723 A1 | 1/2010 | Chambers | |
| 2010/0126403 A1 | 5/2010 | Rooney, III et al. | |
| 2010/0131098 A1 | 5/2010 | Rooney, III et al. | |
| 2010/0217436 A1 | 8/2010 | Jones et al. | |
| 2010/0219003 A1 | 9/2010 | Rooney, III et al. | |
| 2010/0238050 A1 | 9/2010 | Rhodes et al. | |
| 2011/0050374 A1 | 3/2011 | Dvorak | |
| 2011/0067615 A1 | 3/2011 | Rooney, III et al. | |
| 2011/0083599 A1 | 4/2011 | Kornstein et al. | |
| 2011/0208417 A1 | 8/2011 | Fink et al. | |
| 2011/0282536 A1 | 11/2011 | Rooney, III | |
| 2012/0006352 A1 | 1/2012 | Holappa et al. | |
| 2012/0215348 A1 | 8/2012 | Skrinde | |
| 2014/0076223 A1 | 3/2014 | Smith | |
| 2014/0076224 A1 | 3/2014 | Smith | |
| 2014/0076225 A1 | 3/2014 | Smith | |
| 2014/0076226 A1 | 3/2014 | Smith | |
| 2014/0077587 A1 | 3/2014 | Smith | |
| 2014/0081504 A1 | 3/2014 | Smith | |
| 2014/0090906 A1 | 4/2014 | Kornstein et al. | |

FOREIGN PATENT DOCUMENTS

| | | |
|---|---|---|
| CN | 1864944 A | 11/2006 |
| CN | 101387687 A | 3/2009 |
| DE | 3611750 | 10/1987 |
| EP | 1785552 A2 | 5/2007 |
| FR | 1352056 A | 2/1964 |
| FR | 2861457 A1 | 4/2005 |
| FR | 2948920 A1 | 2/2011 |
| GB | 2038721 | 7/1980 |
| GB | 2103162 | 2/1983 |

(56) References Cited

FOREIGN PATENT DOCUMENTS

| | | |
|---|---|---|
| GB | 2165330 A | 4/1986 |
| JP | S48-014096 | 2/1973 |
| JP | S49-001434 | 1/1974 |
| JP | S50-012797 | 2/1975 |
| JP | S50-81487 U | 7/1975 |
| JP | 58-012075 | 1/1983 |
| JP | S58-14096 | 1/1983 |
| JP | S60-131174 | 7/1985 |
| JP | S62-130999 | 8/1987 |
| JP | 04-002592 | 1/1992 |
| JP | H05-19086 | 1/1993 |
| JP | 06-099888 | 4/1994 |
| JP | 08-310384 | 11/1996 |
| JP | H10-16884 | 1/1998 |
| JP | 2003025265 | 1/2003 |
| JP | 2005-335882 | 12/2005 |
| WO | WO 99/07489 A1 | 2/1999 |
| WO | WO 02/074611 A2 | 9/2002 |
| WO | WO 02/074611 A3 | 9/2002 |
| WO | WO 03/087501 A1 | 10/2003 |
| WO | WO 2005/014387 | 2/2005 |
| WO | WO 2007/137234 A2 | 11/2007 |
| WO | WO 2010/059195 | 5/2010 |
| WO | WO 2010/134022 A1 | 11/2010 |
| WO | WO 2011/022037 | 2/2011 |
| WO | WO 2011015786 A1 | 2/2011 |
| WO | WO 2011/034558 | 3/2011 |
| WO | WO 2011/046592 | 4/2011 |
| WO | WO 2011/142800 | 11/2011 |
| WO | WO 2011/146103 | 11/2011 |
| WO | WO 2012/104109 A1 | 8/2012 |

OTHER PUBLICATIONS

U.S. Appl. No. 12/583,346, filed Aug. 19, 2009; James H. Rooney III; office action dated Aug. 26, 2014.

A Copenhagen Climate Treaty; Version 1.0 Draft; A Proposal for a Copenhagen Agreement by Members of the NGO Community; published Jun. 2009; pp. 1-78 (80 pages total).

Anti-Fouling Systems; Focus on IMO, International Maritime Organization; UK; 2002; pp. 1-31; http://www.uscg.mil/hq/cg5/cg522/cg5224/docs/FOULING2003.pdf.

Borchardt; Grooming the Fleet, Biofouling Slows Vessels and Wastes Fuels, so the Navy is Looking at an Underwater Robot to Keep its Hulls Shipshape; Mechanical Engineering; Apr. 2010; pp. 33-35; vol. 132, No. 4.

Fernandez; NAFTA and Member Country Strategies for Maritime Trade and Marine Invasive Species; Journal of Environmental Management; 2008; pp. 308-321; vol. 89.

Garelick, et a; RTI International EnSys Energy & Systems, Inc.; Navigistics Consulting; Global Trade and Fuels Assessment—Future Trends and Effects of Designating Requiring Clean Fuels in the Marine Sector: Task Order No. 1; Draft Report; RTI Project No. 0209701.001; Apr. 2006; 82 pages.

HISMAR; HISMAR News Report No. 2; 2008; http://hismar.ncl.ac.uk/public_docs/News_Reports/News%20Report%20No2_UNEW.pdf; 4 pages.

HISMAR; Hull Identification System for Maritime Autonomous Robots; http://hismar.ncl.ac.uk/public_docs/HISMAR_Poster.pdf; 1 page.

Kohli; Biofouling and Design of a Biomimetic Hull-Grooming Tool; Naval Surface Warfare Center Carderock Division; West Bethesda; MD; NSWCCD-CISD-2007/002; Ship Systems Integration & Design Department Technical Report; Sep. 2007; 38 pages.

Man; B&W, Basic Principles of Ship Propulsion; Basics of Ship Propulsion; Apr. 2004; pp. 1-30.

Munk; Fuel Conservation Through Managing Hull Resistance; Motorship Propulsion Conference; Copenhangen; Apr. 26, 2006; pp. 1-10.

Paik et al.; Condition Assessment of Aged Ships; Proceedings of the $16^{th}$ International Ship and Offshore Structures Congress; Dec. 31, 2006; pp. 273-283; vol. 2; The $16^{th}$ International Ship and Offshore Structures Congress, Southampton, UK.

Preiser et al.; Energy (Fuel) Conservation Through Underwater Removal and Control of Fouling on Hulls of Navy Ships, Naval Research and Development Center, Materials Department, Annapolis, Research and Development Report, Dec. 1975; 52 pages.

Reed et al; Automatic Ship Hull Inspection Using Unmanned Underwater Vehicles; Proceedings from the $7^{th}$ International Symposium on Technology and the Mine Problem; Monterey, USA; May 2006; 10 pages.

Rosenhahn et al; Advanced Nanostructures for the Control of Biofouling: the FP 6 EU Integrated Project AMBIO; Biointerphases; Mar. 2008; Published Feb. 21, 2008; pp. IR1-IR5; vol. 3; No. 1.

Serene et al; Design of a Remotely Operated Vehicle (ROV) for Underwater Ship Hull Cleaning; National University of Singapore; pp. 1-6; 2003.

Tallett et al; Potential Marine Fuels Regulations: Impacts on Global Refining; Costs & Emissions; Joint IFQC & IPIECA Roundtable; Impacts of CO2 Emissions form Refining & Shipping; London, England; Oct. 1, 2007; 17 pages.

Townsin; The Ship Hull Fouling Penalty; Biofouling; Jan. 2003; pp. 9-15; vol. 19 (supplement).

Vaganay et al; Ship Hull Inspection with the HAUV: US Navy and NATO Demonstrations Results; Oceans 2006; Sep. 2006; pp. 1-6.

Yuan et al.; The Design of Underwater Hull-Cleaning Robot; Journal of Marine Science and Application; Jun. 2001; pp. 41-45; vol. 3; No. 1.

Written Opinion of the International Searching Authority, International Application No. PCT/US2011/000787, Jul. 20, 2011, 7 pgs. (unnumbered).

Written Opinion of the International Searchign Authority, International Application No. PCT/US2011/000770, Aug. 9, 2011, 5 pgs. (unnumbered).

Written Opinion of the International Searching Authority, International Application No. PCT/US2010/002163, Oct. 13, 2010, 5 pgs. (unnumbered).

Written Opinion of the International Searching Authority, International Application No. PCT/US2010/002164. Oct. 8, 2010, 5 pgs. (unnumbered).

Written Opnion of the International Searching Authority for PCT Application No. PCT/US2009/006122 mailed Feb. 3, 2010 9 (seven pages).

Written Opinion of the International Searching Authority, International Application No. PCT/US2010/002693, Dec. 9, 2010, 8 pages (unnumbered).

PCT Application PCT/US2010/02693; filed Oct. 6, 2010; Raytheon Company; International Search Report mailed Dec. 9, 2010.

PCT Application PCT/US2011/000787 filed May 5, 2011; James H. Rooney; International Search Report mailed Jul. 20, 2011.

PCT Application PCT/US2011/000770; filed May 3, 2011; James H. Rooney III; INternationa Search Report mailed Aug. 9, 2011.

PCT Application PCT/US2010/002163; filed Aug. 4, 2010; James H. Rooney; International Search Report mailed Oct. 13, 2010.

PCT Application PCT/US2010/002164; filed Aug. 4, 2010; James H. Rooney; International Search Report mailed Oct. 8, 2010.

PCT Application PCT/US2009/006122; filed Nov. 16, 2009; James H. Rooney III; International Search Report mailed Feb. 3, 2010.

PCT Application PCT/US2013/059552; filed Sep. 12, 2013; Raytheon Company; International Search Report mailed Dec. 20, 2013.

PCT Application PCT/US2013/059552; filed Sep. 12, 2013; Raytheon Company; International Search Report mailed Feb. 21, 2014.

PCT Application PCT/US2013/059527; filed Sep. 12, 2013; Raytheon Company; International Search Report mailed Mar. 3, 2014.

PCT Application PCT/US2013/059548; filed Sep. 12, 2013; Raytheon Company; International Search Report mailed Apr. 16, 2014.

PCT Application PCT/US2013/059551; filed Sep. 12, 2013; Raytheon Company; International Search Report mailed Mar. 10, 2014.

(56) References Cited

OTHER PUBLICATIONS

PCT Application PCT/US2013/059546; filed Sep. 12, 2013; Raytheon Company; International Search report mailed Jan. 20, 2014.
PCT Application PCT/US2013/059527; filed Sep. 12, 2013; Raytheon Company; International Search Report mailed May 13, 2014.
PCT Application PCT/US2013/059550; filed Sep. 12, 2013; Raytheon Company; International Search Report mailed Jun. 3, 2014.
PCT Application PCT/US2013/059548; filed Sep. 12, 2013; Raytheon Company; International Search Report mailed Jun. 30, 2014.
EP Application EP09827853; filed Aug. 11, 2011; Raytheon Company; Supplemental European Search Report Apr. 23, 2014.
U.S. Appl. No. 12/313,643, filed Nov. 21, 2008; James H. Rooney III; office action dated Sep. 17, 2012.
U.S. Appl. No. 12/583,346, filed Aug. 19, 2009; James H. Rooney III; office action dated Sep. 25, 2012.
U.S. Appl. No. 12/313,643, filed Nov. 21, 2008; James H. Rooney III; office action issued Apr. 13, 2012.
U.S. Appl. No. 12/586,248, filed Sep. 18, 2009; James H. Rooney III office action issued May 24, 2012.
U.S. Appl. No. 12/587,949, filed Oct. 14, 2009; Howard R. Kornstein; office action issued May 25, 2012.
U.S. Appl. No. 12/800,174, filed May 10, 2010; James H. Rooney III; office action issued Feb. 24, 2012.
U.S. Appl. No. 12/583,346, filed Aug. 19, 2009; James H. Rooney, III; office action dated Feb. 27, 2013.
U.S. Appl. No. 12/583,346, filed Aug. 19, 2009; James H. Rooney III; office action dated Feb. 27, 2014.
U.S. Appl. No. 12/586,248, filed Sep. 18, 2009; James H. Rooney III; office action mailed Dec. 13, 2011.
U.S. Appl. No. 12/586,248, filed Sep. 18, 2009; James H. Rooney III; Notice of Allowance issued Oct. 24, 2012.
U.S. Appl. No. 12/587,949, filed Oct. 14, 2009; Howard R. Kornstein; notice of allowance mailed Sep. 21, 2012.
U.S. Appl. No. 12/800,486, filed May 17, 2010; James H. Rooney III; notice of allowance dated Sep. 27, 2012.
U.S. Appl. No. 12/800,174; dated May 10, 2010; James H. Rooney III; notice of allowance dated Aug. 17, 2012.
U.S. Appl. No. 13/313,643, filed Nov. 21, 2008; James H. Rooney III; office action dated Feb. 26, 2014.
U.S. Appl. No. 13/794,594, filed Mar. 11, 2013; Howard R. Kornstein; office action dated May 1, 2014.
U.S. Appl. No. 13/769,337, filed Feb. 17, 2013; Fraser M. Smith; office action dated Sep. 3, 2014.
U.S. Appl. No. 13/769,339, filed Feb. 17, 2013; Fraser M. Smith; office action dated Sep. 3, 2014.
U.S. Appl. No. 13/769,342, filed Feb. 17, 2013; Fraser M. Smith; office action dated Sep. 10, 2014.
U.S. Appl. No. 13/769,345, filed Feb. 17, 2013; Fraser M. Smith; office action dated Sep. 16, 2014.
U.S. Appl. No. 13/769,345, filed Feb. 17, 2013; Fraser M. Smith; Notice of Allowance mailed Jan. 12, 2015.
U.S. Appl. No. 13/769,339, filed Feb. 17, 2013; Fraser M. Smith; Notice of Allowance mailed Jan. 30, 2015.
U.S. Appl. No. 13/769,337, filed Feb. 17, 2013; Fraser M. Smith; Notice of Allowance mailed Feb. 10, 2015.
Hover et al.; A Vehicle System for Autonomous Relative Survey of In-Water Ships; Marine Technology Society Journal; Jul. 2007; pp. 44-55; vol. 41, No. 2; Marine Technology Society, Washington, D.C.
Menegaldo et al.; Development and Navigation of a Mobile Robot for Floating Production Storage and Offloading Ship Hull Inspection ; IEEE Transactions on Industrial Electronics; Sep. 2009; pp. 3717-3722; vol. 56, No. 9; IEEE Service Center, Piscataway, New Jersey.
Vaganay et al.; Hovering Autonomous Underwater Vehicle-System Design Improvements and Performance Evaluation Results; $30^{th}$ International Symposium on Unmanned Untethered Submarine Technology; Jul. 9, 2009; pp. 1-14.
EP Application 11783852.4; filing date May 5, 2011; Raytheon Company; European Search Report; dated Aug. 18, 2014.
U.S. Appl. No. 13/794,594, filed Mar. 11, 2013; Howard R. Kornstein; office action dated Oct. 15, 2014.
U.S. Appl. No. 13/794,594, filed Mar. 11, 2013; Howard R. Kornstein; office action dated Mar. 4, 2015.
U.S. Appl. No. 13/769,342, filed Feb. 17, 2013; Fraser M. Smith; office action dated Mar. 10, 2015.
U.S. Appl. No. 12/313,643, filed Nov. 21, 2008; James H. Rooney III; office action dated Apr. 8, 2015.
U.S. Appl. No. 12/583,346, filed Aug. 19, 2009; James H. Rooney III; office action dated Apr. 8, 2015.
European Search Report for application EP10817533 dated Jul. 3, 2015, 124 pages.
Office Action for application 201180031384.8 dated Jun. 1, 2015, 14 pages including English translation.
Office Action for U.S. Appl. No. 13/769,342 dated Jul. 14, 2015, 26 pages.
European Search Report for application 10823726.4 dated Jun. 23, 2015, 104 pages.
Notice of Allowance for U.S. Appl. No. 13/794,594, mailing date Aug. 27, 2015, 18 pages.
Office Action for U.S. Appl. No. 13/769,346 dated Aug. 11, 2015, 33 pages.

* cited by examiner

HULL CLEANING ROBOT

RELATED APPLICATIONS

This application claims the benefit of the following provisional patent applications, the contents of each of which are incorporated herein by reference in their entirety: U.S. provisional patent application Ser. No. 61/701,512, filed on Sep. 14, 2012; U.S. provisional patent application Ser. No. 61/701,517, filed on Sep. 14, 2012; U.S. provisional patent application Ser. No. 61/701,523, filed on Sep. 14, 2012; U.S. provisional patent application Ser. No. 61/701,529, filed on Sep. 14, 2012; U.S. provisional patent application Ser. No. 61/701,534, filed on Sep. 14, 2012; and U.S. provisional patent application Ser. No. 61/701,537, filed on Sep. 14, 2012.

This application is related to U.S. patent application Ser. No. 13/769,337, filed on Feb. 17, 2013, and entitled, "Hull Robot for Autonomously Detecting Cleanliness of a Hull"; Ser. No. 13/769,339, filed on Feb. 17, 2013, and entitled, "Autonomous Hull Inspection"; Ser. No. 13/769,342, filed on Feb. 17, 2013, and entitled "Autonomous Hull Navigation"; Ser. No. 13/769,345, filed on Feb. 17, 2013, and entitled, "Hull Robot With Hull Separation Countermeasures"; and Ser. No. 13/769,346, filed on Feb. 17, 2013, and entitled, "Magnetic Track", the contents of each of which is hereby incorporated by reference herein in their entirety.

This application is related to U.S. patent application Ser. No. 13/769,337, filed on Feb. 17, 2013, and entitled, "Hull Robot for Autonomously Detecting Cleanliness of a Hull"; Ser. No. 13/769,339, filed on Feb. 17, 2013, and entitled, "Autonomous Hull Inspection"; Ser. No. 13/769,342, filed on Feb. 17, 2013, and entitled "Autonomous Hull Navigation"; Ser. No. 13/769,345, filed on Feb. 17, 2013, and entitled, "Hull Robot With Hull Separation Countermeasures"; and Ser. No. 13/769,346, filed on Feb. 17, 2013, and entitled, "Magnetic Track", the contents of each of which is hereby incorporated by reference herein in their entirety.

BACKGROUND

The frictional resistance of a vessel hull as it moves through the water can constitute 45% to 90% of the total resistance experienced by the vessel and may be increased by 6% up to 80% due to fouling of the hull by algae, sea grass, barnacles, and the like. As an example, an added resistance of 30% due to moderate bio-fouling of a tanker hull can increase the fuel consumption of the vessel by up to twelve tons per day. The result is added cost to operate the vessel, as well as increased emissions.

Accordingly, there are a variety of methods employed to reduce the likelihood of bio-fouling and/or to rid vessel hulls of bio-fouling through cleaning. For example, anti-fouling hull paints and coatings are often used in an effort to decrease the likelihood of bio-fouling, but such treatments do not always work reliably and can require frequent periodic applications. Such methods can be associated with significant cost as the vessel often must be dry docked for an extensive period of time while the paint and/or coating is applied. There are also environmental concerns with anti-fouling paints and coatings.

It is common, while a vessel is dockside and/or during normal unloading conditions, that the hull be periodically cleaned manually (e.g., by scuba divers) using motorized brushes. However, the cost of such a cleaning procedure is also high as this type of cleaning effort can be needed often. In some cases, manual hull cleaning procedures are commissioned every ten to twenty months, and in other cases even sooner if needed. Unfortunately, there are significant drawbacks to manual cleaning methods. For instance, as the procedure is carried out while the vessel is dockside, cleaning residue and debris (e.g., paint chips, etc.) are disposed in the shallow waters surrounding the docks. Because of this, many jurisdictions have made this practice illegal, particularly due to the toxicity of anti-fouling paint which can contaminate the water.

SUMMARY

A hull cleaning robot, in accordance with an embodiment of the present technology, includes a robot body and a drive module within the robot body for maneuvering the robot about a hull. The drive module includes a drive element for holding the robot on the hull as the robot maneuvers about the hull. The drive element includes a cleaning function for cleaning the hull of a vessel.

A method of cleaning a hull of a vessel, in accordance with an embodiment of the present technology, includes positioning a robot about the hull of the vessel and maneuvering the robot about the hull using a drive module within the robot. The method further includes cleaning the hull using the drive module as the robot is maneuvered.

A hull cleaning robot, in accordance with an embodiment of the present technology, includes a robot body and a drive module within the robot body for maneuvering the robot about a hull. The drive module includes a drive element and a cleaning track. The drive element can be configured to hold the robot on the hull as the robot maneuvers about the hull, the cleaning track can be configured to clean the hull as the robot maneuvers about the hull. Also, the drive element and the cleaning track can rotate in different directions and/or at different speeds to provide a further cleaning function.

A hull robot, in accordance with an embodiment of the present technology, includes a robot body, one or more ports formed in the robot body for receiving passing fluid, and one or more fluid conduits in fluid communication with the one or more ports, wherein the fluid conduits are configured to redirect the passing fluid received through the ports toward the hull.

A hull robot, in accordance with an embodiment of the present technology, includes a deployable skirt configured to be deployed against a vessel hull to create at least a partial seal against the hull, and an active pump configured to pump out water from within the robot or a passive system to redirect water flow from within the skirt, each to create a low pressure area within the robot, wherein a suction effect is created that helps to adhere the robot to the hull.

DETAILED DESCRIPTION

Figure 1:
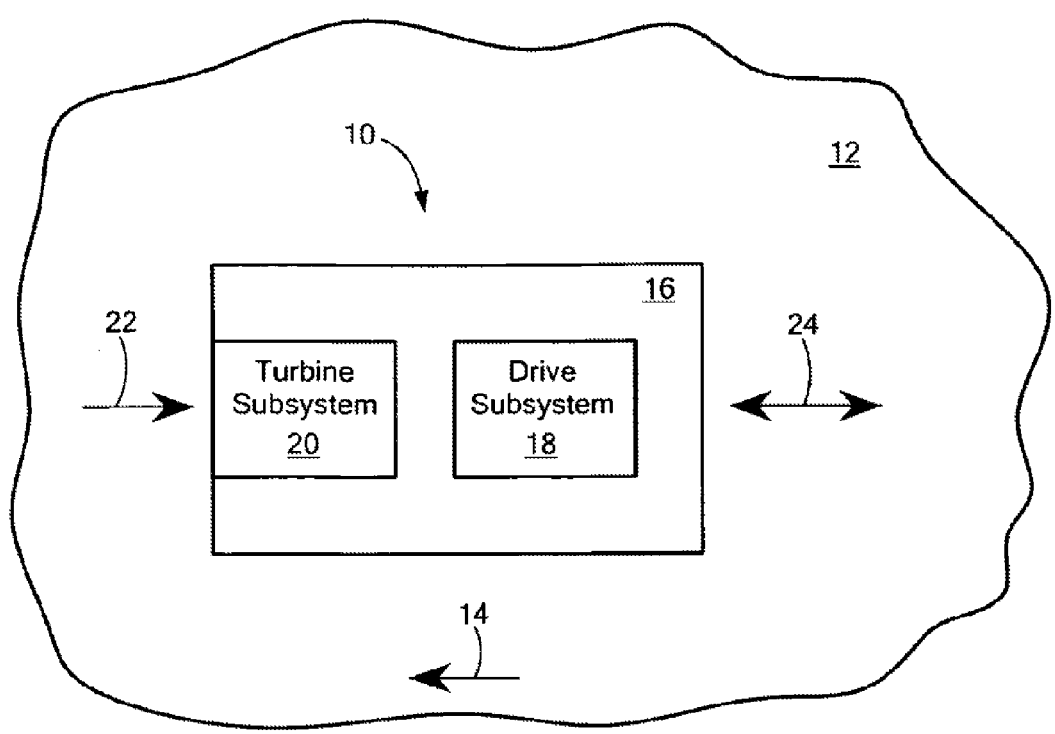
FIG. 1 is a schematic block diagram showing an example of a robot in accordance with an example of the present technology.

Before the present disclosure is described herein, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

The following terminology will be used in accordance with the definitions set forth below.

As used herein, "robot body" is intended as a broad term to define one or more structural components (e.g., a frame, chassis, cover, etc.) capable of supporting one or more other components of a hull robot or its subsystems, and/or capable of providing covering and/or concealment of one or more components or subsystems of the hull robot.

As used herein, the singular forms "a," and, "the" include plural referents unless the context clearly dictates otherwise.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

EXAMPLE EMBODIMENTS

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

It is noted in the present disclosure that when describing the system, or the related devices or methods, individual or separate descriptions are considered applicable to one another, whether or not explicitly discussed in the context of a particular example or embodiment. For example, in discussing an energy harvester configuration per se, the device, system, and/or method embodiments are also included in such discussions, and vice versa.

Furthermore, various modifications and combinations can be derived from the present disclosure and illustrations, and as such, the following figures should not be considered limiting.

FIG. 1 illustrates what is representative of a robot 10 on a vessel (e.g., a ship) hull 12 underway in the direction of vector 14. Robot body 16 houses a drive subsystem 18 and a turbine subsystem 20. Fluid (e.g., water) moves past the hull 12 in the direction of vector 22 due to the motion of the vessel. In accordance with the subject invention, the turbine subsystem 20 is actuatable (e.g., driven) by the moving fluid and used to operate at least a drive subsystem 18. In an example not shown in FIG. 1, a water wheel subsystem may be used in place of the turbine subsystem to operate the drive subsystem.

The result is a robot able to maneuver, at a minimum, in the directions about hull 12 as shown by arrows 24. Furthermore, the robot is able to maneuver in one or more controlled paths about the hull which are not necessarily aligned with vector 14 and which are in addition to the directions shown by arrows 24. The robot can be powered by the action of the water flowing past the hull while the vessel is underway. In this way, cleaning and/or inspection and the like can be undertaken even continuously while the vessel is in operation. The robot can thus be configured to harvest energy for operation from the action of a fluid flowing over the hull and about or past the robot.

Typically, other subsystems can be included as components of robot 10, for example, a cleaning subsystem, a navigation subsystem, a communications subsystem, and the like. Moreover, although certainly possible in some embodiments, in many embodiments the robot body 16 need not be tethered to any kind of power or control subsystem. The turbine subsystem can operate drive subsystem 18 (and, in one example, a cleaning subsystem) directly or via a generator charging a power subsystem (e.g., a battery pack) which supplies power to one or more motors driving the drive subsystem and/or the cleaning subsystem. The battery pack can also be used to energize the other electronic and/or electromechanical subsystems associated with the robot. In one aspect, the generator may drive one or more motors directly.

Where the turbine subsystem operates the drive subsystem directly, the turbine subsystem may be part of a direct drive system. In another example, the direct drive system may use the turbine or any other suitable power scavenging device to at least partially power the drive subsystem, a cleaning subsystem, or any other subsystem onboard the hull robot. The hull robot may include an electric motor also operable to at least partially power the subsystem. The electric motor may draw power from a power supply operable to provide the power to the electric motor. Power for the power supply may optionally be generated by the power scavenging system to charge the power supply. When in operation with passing water having a velocity above a velocity threshold as generated by the vessel in motion above a pre-determined threshold speed, the direct drive system may supplement power output of the motor to at least reduce a power demand on the motor from the subsystem to operate the subsystem. As a specific and non-limiting example, the direct drive system may include a water wheel as the power scavenging system/device, where the water wheel is directly coupled to a cleaning subsystem including a brush to rotate the brush against the hull of the vessel to clean the hull.

The direct drive system may be sufficiently sized and configured to completely power the subsystem and eliminate the power demand on the motor from the subsystem when the hull robot is operated in the passing water having a velocity above the velocity threshold as generated by a vessel in motion above a pre-determined threshold speed. The hull robot may also include a submersion detection device to detect whether the hull robot is submersed in the passing water. In one example, the submersion detection device may simply be a float or bob coupled to an electrical switch configured to rise toward a water surface when submerged and to have a resting position when out of the water, where the floating and resting positions may represent on and off positions for the switch for detecting whether or not the robot is submerged. The direct drive subsystem may thus power the subsystem(s) when the robot is underwater and the power supply may power the subsystem(s) when the robot is above water. Also, the direct drive subsystem and the power supply may work together to power the subsystem(s) when the robot is submerged.

In one example, the direct drive system may include a transmission to generate a desired torque for operation of the subsystem. Also, a governor may be used to limit operation of the subsystem to avoid damage to the subsystem.

An example method of operating a hull robot including a direct drive system may be as follows. A detector may detect whether the hull robot is submersed in passing fluid resulting from a vessel in motion. A subsystem of the hull robot may be operated using a motor when the hull robot is not submersed in the passing fluid, or when submersed in fluid having a velocity below a velocity threshold. The subsystem of the hull robot may be operated, at least in part, using a direct drive system when the hull robot is submersed in the passing fluid having a velocity above the velocity threshold. For example, both the motor and the direct drive system may be used when the hull robot is submersed in the passing fluid having a velocity above the velocity threshold.

Figure 2:
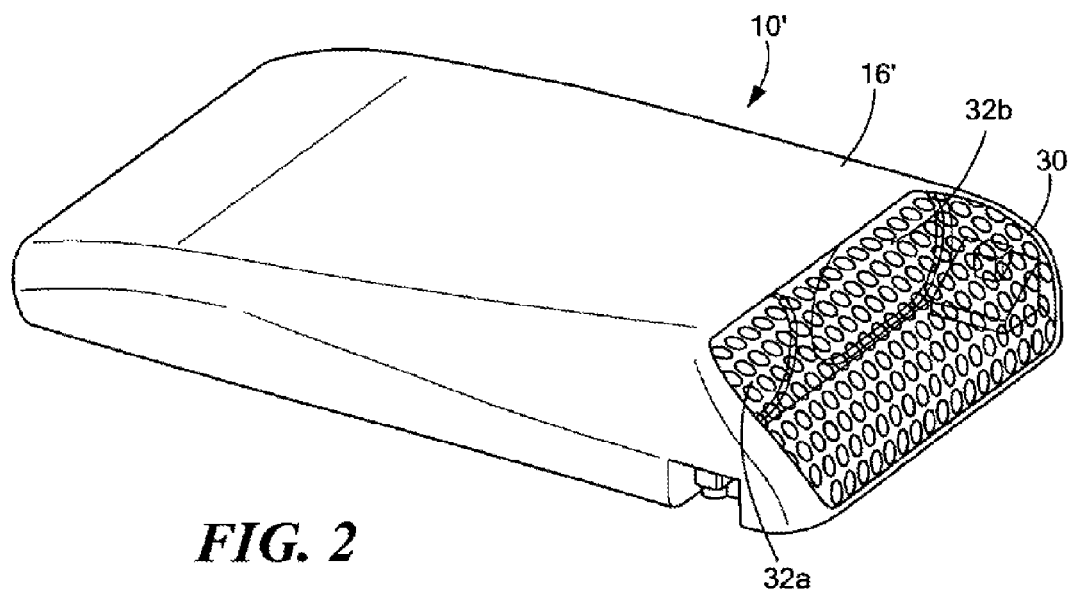
FIG. 2 is a perspective view of an example hull robot in accordance with an example of the present technology.

In one particular example, the robot 10', shown in FIG. 2, includes a body 16' with a flow inlet filter screen 30. Body 16 can comprise any number of hydrodynamic or other shapes or configurations. As such, the shape or configuration illustrated is not meant to be limiting in any way. The shape or configuration can be designed to urge the robot against the hull or to increase a force of attachment of the robot to the hull, when the robot is deployed on the hull, as water moves over the robot due to the action of the ship moving through the water. In other words, depending upon the particular hydrodynamics of the robot, water passing over the robot can induce a downward force on the robot that urges the robot against the hull or that functions to more aggressively attach the robot to the hull, such as by increasing an already existing force of attachment, thus helping to secure the robot to the hull.

Figure 3:
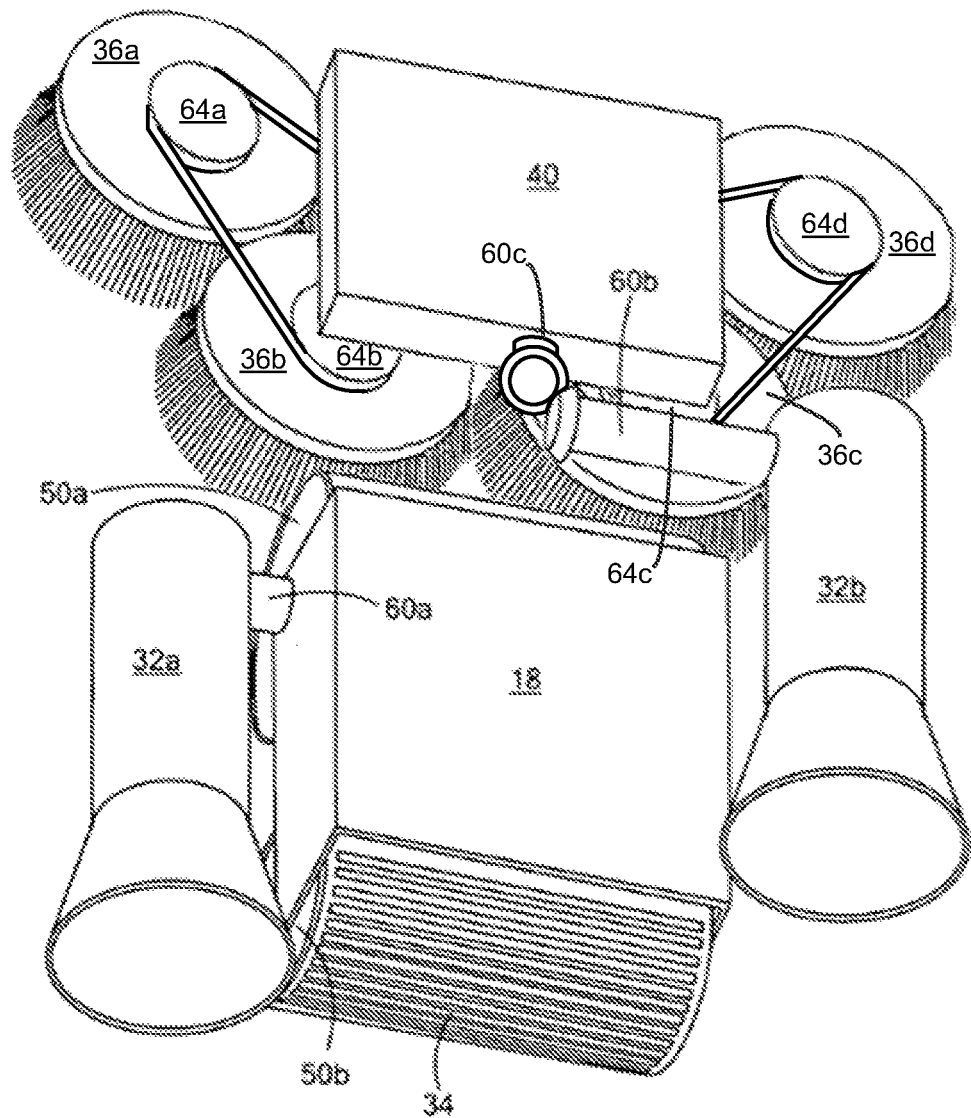
FIG. 3 is top perspective view of components within a hull robot in accordance with an example of the present technology.

Referring to FIG. 3, the intakes of turbines 32a and 32b can be behind the screen 30. The intakes of turbines 32a and 32b can be exposed, via screen 30, to fluid moving past the hull. In this example, robot housing 16 is approximately thirty-six inches long, twenty-four inches wide, and six inches tall.

Figure 9A:
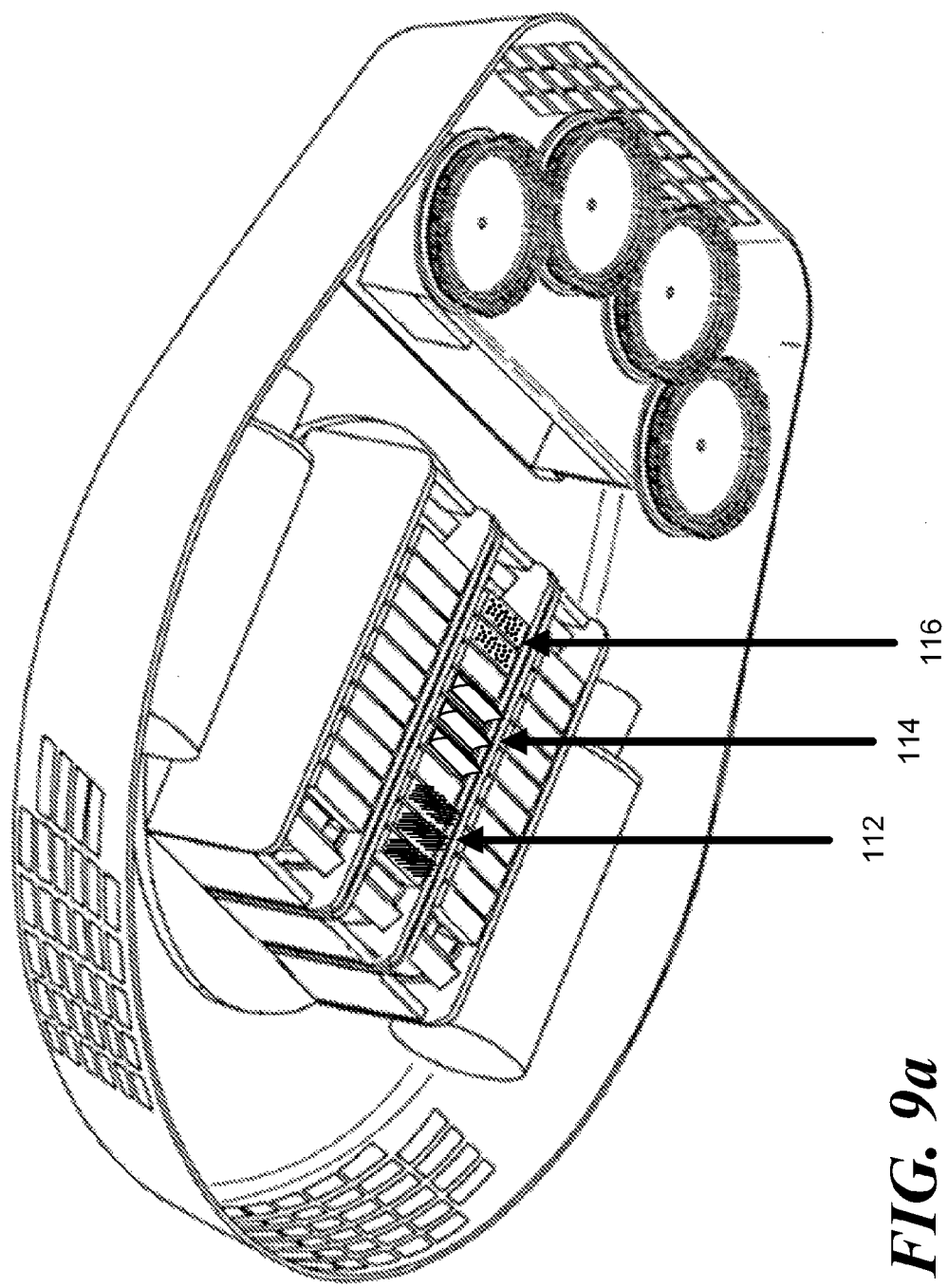

The drive subsystem in this example includes at least one drive track 34 configured to facilitate locomotion of the robot 10 about the hull, and to hold the robot on the hull as the robot maneuvers. In one aspect, multiple drive tracks may be provided. Cleaning brushes 36a-36d can be included for cleaning the hull of the vessel. A battery pack and/or electronic control module can also be included. The brush(es) may be driven by gear drives 60a-60c, respectively, which may in turn be driven by the shaft of one of the turbines 32a or 32b, or by a motor in an embodiment where the shaft of turbine 32b drives a generator providing power to battery pack for the operation of the motor. For example, the cleaning brushes 36-36d may be supported by the robot body and may be rotated using a belt and pulley system actuated by a motor 40 (which may be powered by power source 38), where some brushes 36a-36b counter-rotate relative to other brushes 36c-36d. Any number of brushes or cleaning elements in any configuration or organization may be used to suit a particular application, such as a greater or lesser number of brushes. For example, FIG. 3 illustrates brushes 36b-36c closer to endless belt 34 or a center of the robot than the configuration of FIG. 5 or FIGS. 9a-9b where brushes 36b-36c are relatively farther from the center and closer to an edge of the robot as compared with FIG. 3. Other cleaning subsystems are also contemplated. For example, the robot could include a squeegee, a passive cleaning pad, water jets, and the like. Where a passive cleaning apparatus is used, power in the form of electricity or torque generated by the turbine subsystem would not generally be used to operate the cleaning apparatus.

Turbine 32a can be used to drive a track roller 50a directly in the case where the shaft of turbine 32a is coupled to the track roller via a drive train. But, preferably, the shaft of turbine 32a is coupled to a generator powering motor which drives the track roller.

In one example, an endless belt 34 is disposed over rollers 50a and 50b and includes magnets and/or magnetic materials 52 embedded (e.g., encapsulated) in the material of the belt, which can be made of rubber. Such a magnetic belt may effectively secure the robot to the hull of the vessel. Other magnetic subsystems used to engage a robot with the hull of a vessel are also contemplated.

In a specific example, the shaft of turbine 32a is coupled to a drive train 60a which drives track roller 50a, and the shaft of turbine 32b is coupled to another drive train 60b which drives one or more cleaning brushes 36a-36d via belts and pulleys 64a-64d or gearing 60a-60c. Other means for operating the at least one drive track and the cleaning apparatus are also contemplated. For example, the shaft of the turbine, or the drive train to which the turbine is coupled, may be coupled to a battery or energy harvesting device.

Figure 4:
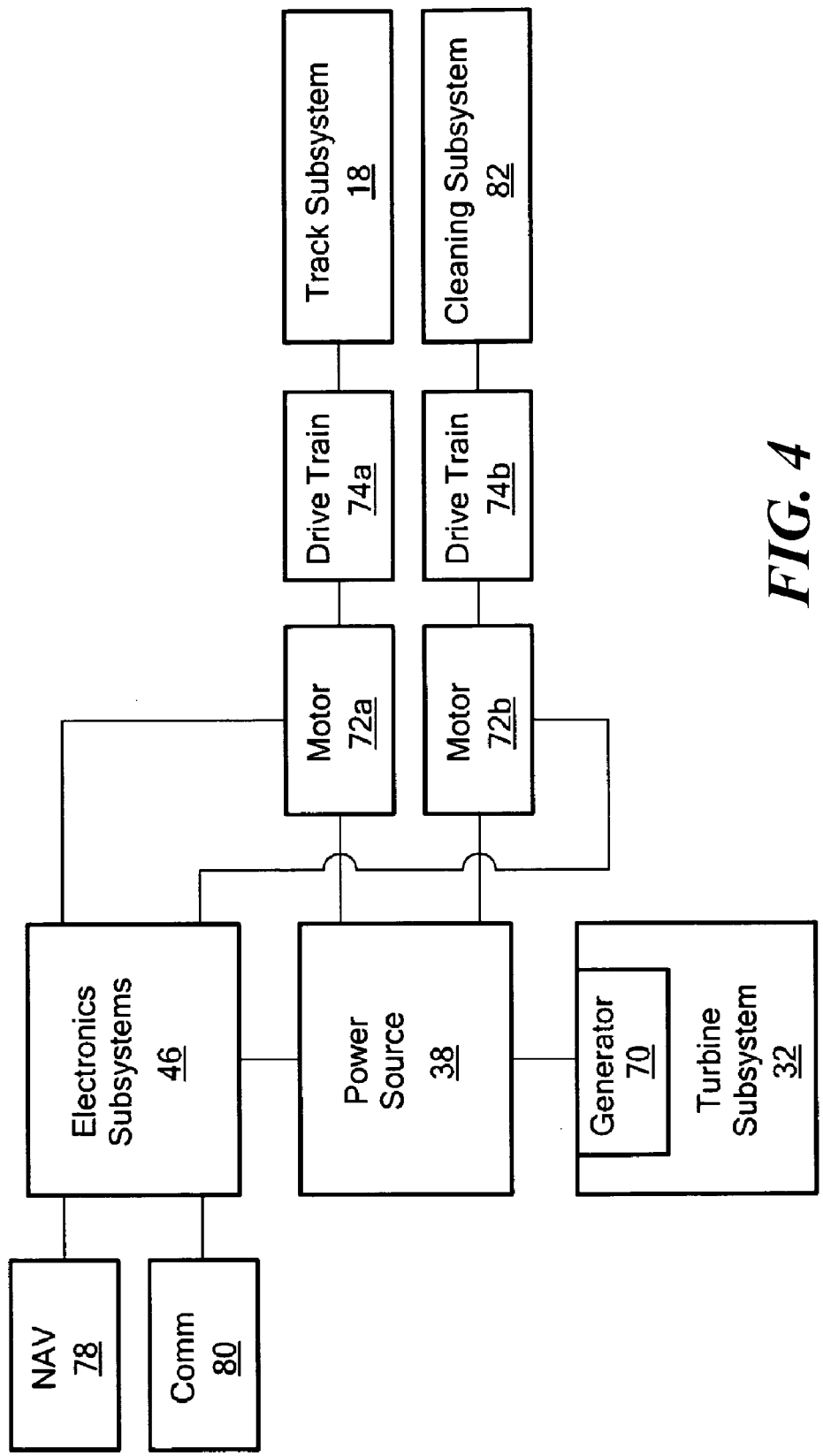
FIG. 4 is a block diagram showing the subsystems associated with one version of a hull cleaning robot in accordance with the subject technology.

FIG. 4, for example, illustrates an embodiment of the subject invention where turbine subsystem 32 (including one or more devices actuatable by fluid flowing past the hull) includes generator 70 which recharges power source 38. One or more motors, such as motors 72a and 72b, are powered by power source 38. Motor 72a drives track subsystem 18 via drive train 74a. The direction of travel of the robot can be reversed via electronic control subsystem 76 which is configured to reverse the direction of motor 72a based on inputs, for example, from navigation subsystem 78 and/or communication subsystem 80. Electronic control subsystem 76 can also be powered by power source 38. Similarly, motor 72b can be configured to drive cleaning subsystem 82 (e.g., one or more brushes as described above) via drive train 74b. Motor 72b can also be powered or energized by power source 38. In other embodiments, the one or more motors may operate on the basis of a power source other than electricity. Motors are known, for example, that are fluid driven. The turbine subsystem, then, may pump fluid under pressure to the motors. If the cleaning subsystem is passive, e.g., a pad and/or a squeegee, motor 72b and drive train 74b may not be required, unless, for example, as a redundancy system.

If the cleaning subsystem is active, e.g., driven, it may be beneficial to operate the cleaning apparatus to assist in robot locomotion or maneuvering operations. For example, two rotating cleaning brushes could be operated in opposite directions so there is at least a reduction of, and in some cases no, net force on the robot. As another example, a larger single front and/or rear brush (such as an elongate roller type brush) rotatable about an axis oriented transverse (e.g., perpendicular) to the primary direction of travel of the robot can be used to assist in robot locomotion or maneuvering operations. In one aspect, the roller brush could be operated to rotate opposite the direction of travel of the track, such as when the robot is maneuvering in the direction of the water flowing past the hull (i.e., downstream). In this operating scenario, the roller brush can be used to stabilize the robot about the hull by providing a countering force to that generated by the counter-rotating track. In another aspect, the roller brush could be operated to rotate in the same direction as the travel of the track, such as when the robot is maneuvering upstream. In this operating scenario, the roller brush can provide added power in the direction of travel. The brushes and the track may rotate at the same or different rate. In the event the robot is maneuvering in a direction transverse to the water flow direction, it may also be desirable to operate the brush and the track in the same direction.

Figure 5:
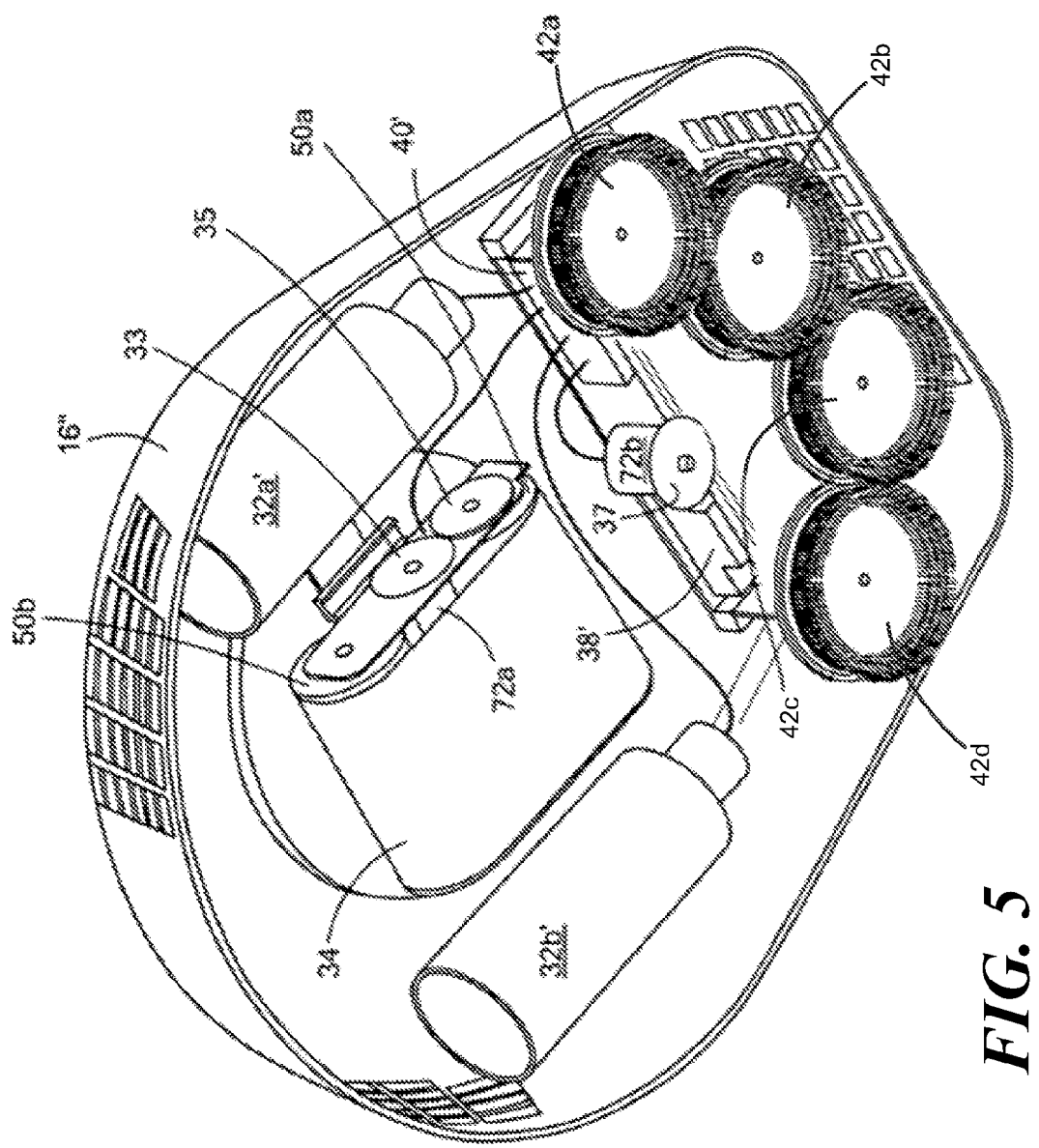
FIG. 5 is a schematic bottom view of a hull cleaning robot in accordance with the subject technology based on the design shown in FIG. 4.

FIG. 5 shows robot body 16" housing turbine/generator units 32a' and 32b' which, when deployed, charge battery 38' via controlling electronics 40'. Battery 38 provides power (via controlling electronics 40') to drive belt motor 72a which turns gear 33 driving gear 35 of drive belt roller 50a. Battery 38 also provides power (via controlling electronics 40') to brush motor 72b which turns gear 37 cooperating with a gear to drive cleaning brush gears 42a-42d. Controlling electronics 40' (typically employing a microprocessor, power circuits, and the like), can also be powered by battery 38.

Figure 6:
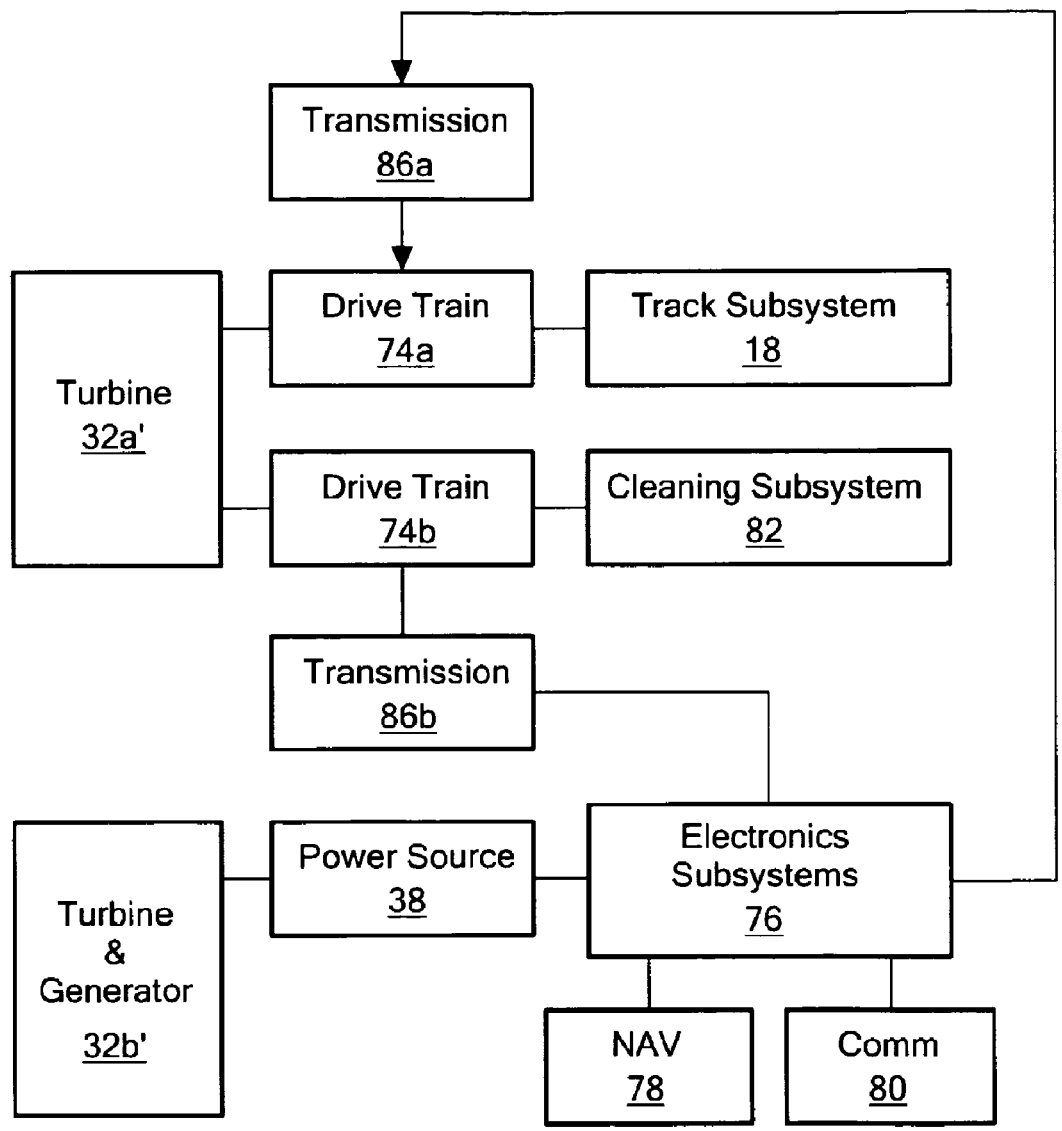
FIG. 6 is a block diagram showing the primary subsystems associated with another version of a hull cleaning robot in accordance with the subject technology.

FIG. 6 illustrates a more direct drive version where turbine 32a', via drive train 74a, drives drive subsystem 18. Turbine 32a, via drive train 74b, drives cleaning subsystem 82 if it is active. Transmission 86a, under the control of electronic controller subsystem 76, may be associated with drive train 74a to control the operation, speed, and direction of the track subsystem 18. Similarly, transmission 86b, under the control of electronic subsystem 76, may be used to facilitate the operation of cleaning subsystem 82.

Figure 7:
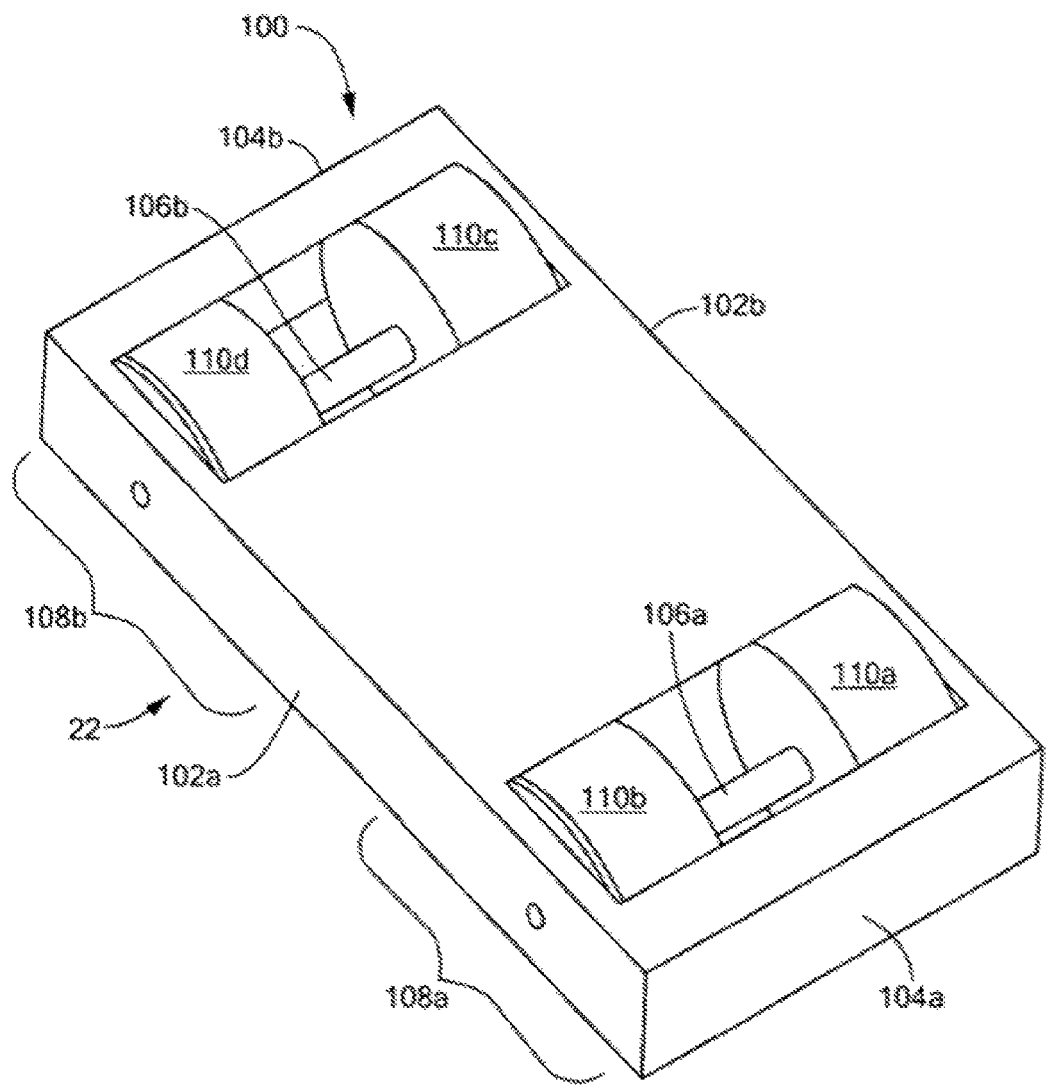
FIG. 7 is a schematic bottom view of an example motorized propulsion subsystem in accordance with the subject technology.

FIG. 7 shows an example of a drive system 98, which includes a plurality of drive wheels. System 98 includes frame 100 with spaced side wall 102a and 102b interconnected by end walls 104a and 104b. Spaced axles 106a and 106b, in this example, are rotatably disposed between side walls 102a and 102b, such that frame 100 defines first frame portion or section 108a housing axle 106a, and second frame portion 108b houses axle 106b. Axles 106a, 106b support, in this particular example, wheels such as spaced magnetic wheels 110a and 110b on axle 106a and spaced wheels 110c and 110d on axle 106b. The term "wheels", as used herein, can refer to wheels, such as drum shaped wheels (also referred to as rollers). In a more specific example, "wheels" can refer to a pair of spaced apart wheels, drums, or sprockets used in a magnetic track, and/or other rolling structures. For example, as disclosed herein, axle 106b can support a drum type wheel or there may be two spaced axles supported by frame section 108b supporting spaced drums or sprockets for receiving and supporting a magnetic track housed by frame section 108b. The same is true with respect to frame section 108a. In some examples, the wheels can be magnetic to form the magnetic track or otherwise secure the robot against the hull of the vessel. In other examples, the magnetic track can be an endless belt, such as an endless belt made, at least in part, from rubber or another suitable material, wherein the endless belt can be supported about the wheels, such as those shown in FIG. 7, and which can be circumrotated around the wheels by rotation of the wheels.

Figure 8:
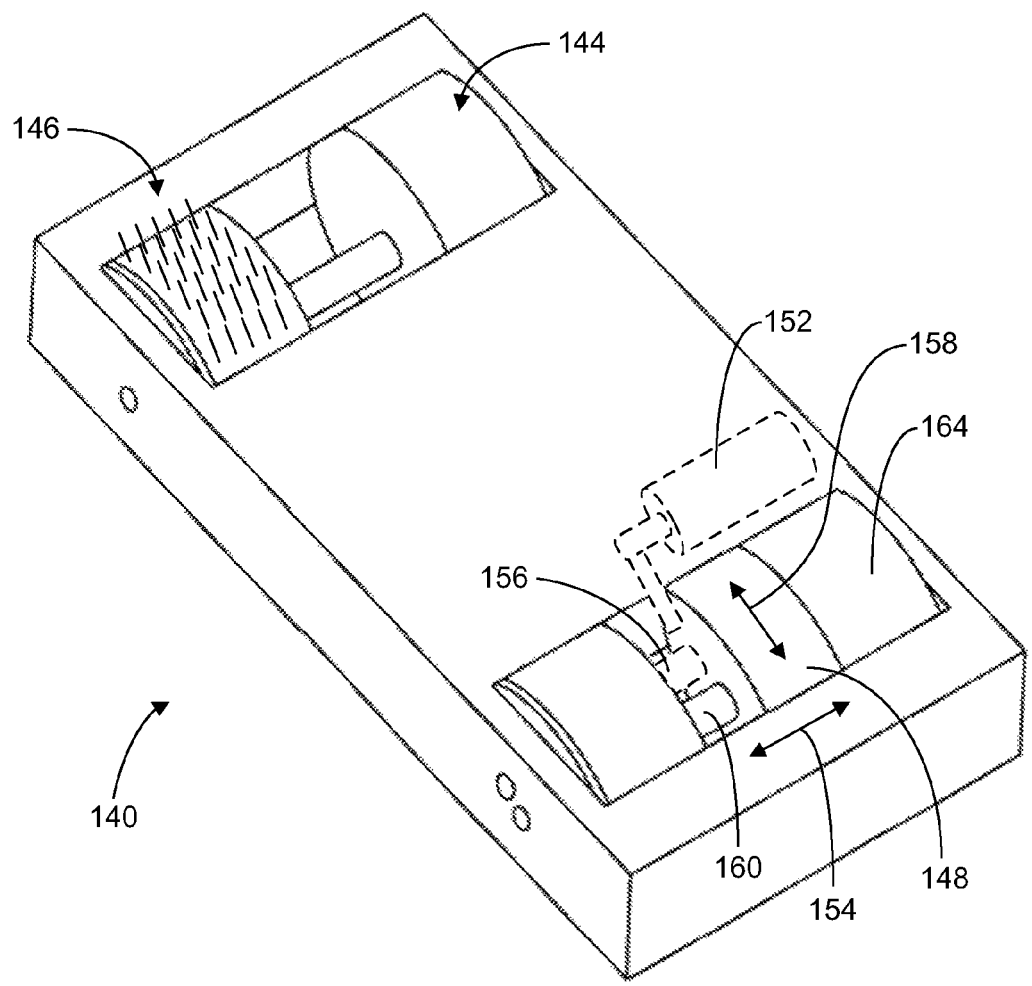
FIGS. 8-9b are schematic bottom views of example motorized propulsion subsystems including cleaning functionality in accordance with the subject technology.

Referring now to FIG. 8, a portion of a hull cleaning robot is shown in accordance with an example which includes a drive module or drive subsystem 140 for maneuvering the robot about a hull. The drive module or subsystem 140 can include a drive element 144 (in the form of a belt or track, wheels, etc., or any combination of these) configured to hold the robot on the hull as the robot maneuvers about the hull, as well as to facilitate locomotion. The drive element itself can further provide a cleaning function, and thus may be referred to as a cleaning drive element (which may also facilitate locomotion at least to some extent). In one aspect, the drive element can provide the cleaning function by being operated differently than it would if it were just providing locomotion. In another aspect, the drive element may comprise a cleaning element 148 supported thereon for facilitating the cleaning function and for cleaning the hull of a vessel. In other words, the drive element itself can be used to clean, or assist in cleaning, the vessel hull. This functionality is achieved through the interaction of the drive element with the surface of the hull as the robot maneuvers about the hull. Not only can the drive element provide a locomotion function, but it can also be caused to provide a cleaning function by being operated in one or more specific ways to create relative movement between the drive element and the hull. Relative movement between the drive element and the hull can create or generate friction between these, such as a scraping function as the drive element is caused to slide along the surface of the hull to some degree.

The cleaning element 148 can comprise at least a portion of the drive element or drive module that can be configured to clean the hull by any of a variety of suitable methods. For example, the drive element may be configured to oscillate relative to the hull (e.g., at a high rate, such as at ultrasonic frequencies) as the robot maneuvers about the hull to provide the at least one cleaning function. The oscillation may be, for example, provided by the oscillation of a roller wheel, with or without a rubber track. Where the drive system includes the roller wheels and no rubber track, at least one roller wheel can oscillate relative to another wheel, such as to a non-oscillating wheel, or to a wheel oscillating at a different rate. In the exemplary embodiment shown, the oscillating function is achieved by means of a piston 152 coupled to the oscillating wheel. The piston 152 can be operable to move back and forth and cause the oscillation of the coupled oscillating wheel thereby, as indicated by arrow 154.

The non-oscillating wheel can be magnetic to rotatably secure the robot against the hull. The oscillating wheel may be non-magnetic or have a different degree of magnetic attraction as the non-oscillating wheel. The non-oscillating wheel may further comprise a brush, scraper, squeegee, pad, or other suitable device or material to remove fouling from the hull of the ship as the oscillating wheel oscillates. For example, wheel 146 illustrates a non-oscillating magnetic wheel with bristles thereon, as a brush, for cleaning the hull during operation.

The oscillation of the oscillating wheel 148 can be in any suitable direction. For example, the oscillating wheel can move side to side in a direction 154 orthogonal to a direction of rotation of the non-oscillating wheel 164. In some examples, the wheel can oscillate by rotating in a substantially same direction as the non-oscillating wheel, and then counter-rotating in a direction opposite from the rotation of the non-oscillating wheel, as indicated by arrow(s) 158. In other words, cleaning functionality can be enhanced by rotating the oscillating wheel back and forth in opposite directions. In another example, the oscillation of the oscillating wheel can be towards and away from the surface of the hull to oscillate a cleaning element closer and farther away from the hull surface. In another example, a secondary drive shaft 156 can be provided for rotating the oscillating wheel in the desired direction, such as a direction indicated by arrow(s) 158. The secondary drive shaft can be adjacent to or integral with a primary drive shaft 160 for turning the locomotion wheels 164.

In examples where the drive system includes a rubber track, an oscillating wheel or other device can cause at least a portion of the rubber track to oscillate side to side, front to back, or towards and away from the surface of the hull using similar methods and devices as described above for moving or oscillating a cleaning element or oscillating wheel. For example, if a rubber track is held at two ends with magnetic devices located at the ends rather than in the track itself, a portion of the track between the two ends may have at least a small amount of give to be able to move from side to side. The drive system can include an actuator or piston positioned between the two ends configured to push and/or pull the portion of the track between the ends toward one or more of the sides. In one example, the track can be pushed or pulled in a single direction. In another example, the track can be pushed or pulled in at least two directions. In one aspect, the drive system can be configured to either push or pull the track in a first direction and then to pull or push the track back in an opposite second direction. However, in a simpler aspect, the drive system can be configured to either push or pull the track in the first direction and then to allow the track to return to the original position on its own due to the resistance of a rubber track to deformity, or the urging of the track in a linear arrangement due to the rotation of the track, or due to any other suitable force. In another example, rapid oscillation of the track can be performed whether the robot is moving forward or backward by causing the supporting wheels to oscillate very rapidly (similar to vibrating) as the track is also caused to perform a locomotion function.

In one example, a drive system comprises at least two drive elements, such as at least two drive wheels. The at least two drive elements can be configured to travel in a different direction relative to one another. For example, a first drive element can rotate or travel in a first direction and can cause the robot to move in the direction of the rotation. The second drive element can travel or rotate in a different direction, such as an opposite, parallel direction, to provide a cleaning function as relative movement between the second drive element and the hull is created. Other examples are also contemplated, such as having the second drive element travel in a direction orthogonal to the direction of travel of the first drive element. Whereas the first drive element may comprise locomotive functionality for the robot, the second drive element may comprise cleaning functionality for the robot. For example, as in FIG. 9a, the second drive element may comprise a brush 112, scraper or squeegee 114, frictional track pads 116, or other suitable device or material supported thereon to remove fouling from the hull of the ship as the second drive element rotates. The rotation of the second drive element in a direction different from that of the first drive element can enhance the cleaning functionality of the second drive element as compared with a scenario where the second drive element rotates in a substantially same direction as the first drive element.

Figure 9B:
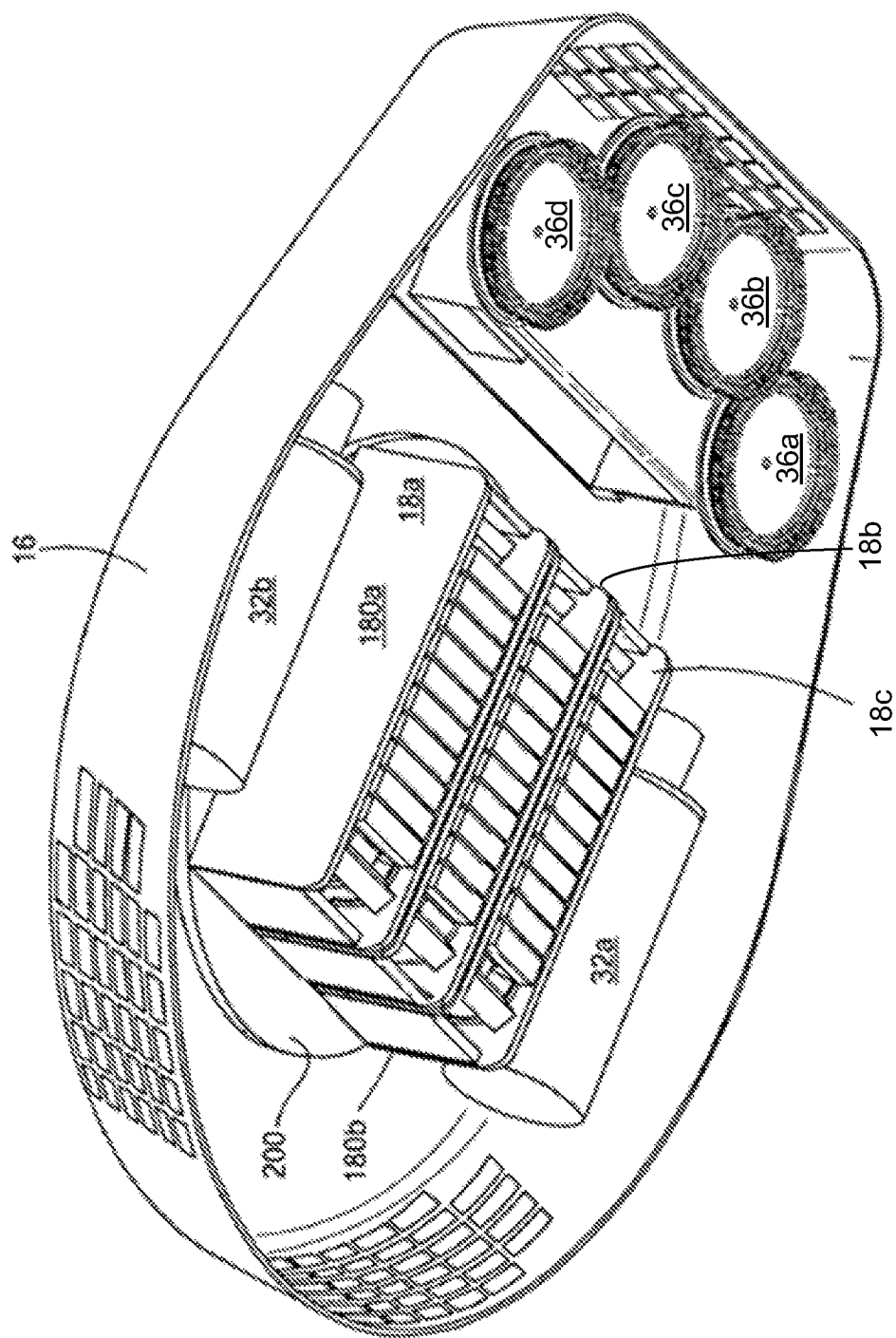

In essence, it is contemplated herein that the drive elements, whether they be wheels, tracks, a combination of these, etc., can be operated in a manner so as to provide relative movement between the drive elements and the hull, and thus a cleaning function, as they interface with the hull surface. The cleaning function may be performed simultaneous with a navigation or locomotion function.

Where the drive system includes three or more drive elements 18a-18c, such as the system shown in FIG. 9b, multiple drive elements can be simultaneously used for locomotion or multiple drive elements may be simultaneously used for cleaning the hull. For example, in a three track system, the outer two tracks 18a, 18c can be used for locomotion while the middle track 18b can be used for cleaning (e.g., caused to rotate in a different direction, equipped with cleaning elements (e.g., scrapers, etc.), caused to oscillate at a rapid rate, etc.). In a four track system, the inner two tracks may be used for cleaning or the tracks can be alternated such that every other track functions as a cleaning track.

In one example including a drive system with at least two drive elements, the tracks can be made from different materials or can include different materials. For example, a locomotion track may comprise a rubber track with magnets therein, and a cleaning track can comprise a rubber track without magnets, but with various cleaning elements supported thereon (e.g., scrapers). As another example, both tracks may be metallic tracks made from different metals. As another example, a track can be made from or include a plastic, organic, composite or other material.

In an example including a drive system with at least two drive elements, the tracks can be configured to rotate in a same or substantially similar direction but at different speeds, thus creating relative movement and a degree of friction between the cleaning track and the hull to effectuate cleaning. For example, a cleaning track may be driven faster or slower than the locomotion track. The speed of the cleaning track relative to the locomotion track can be adjustable based on a degree or type of fouling on the hull. As described in the related applications incorporated above, a hull robot can detect a cleanliness of the hull. The robot can use the detected cleanliness data to automatically and dynamically adjust the rotation speed of the cleaning track. In one aspect, the hull robot can detect the cleanliness of the hull cleaned by the cleaning track as the cleaning track cleans or immediately following thereafter and can adjust a speed of the cleaning track in real time. The cleaning track can also be caused to be driven while the locomotion track (and thus the robot) are held still at rest in a location to be cleaned.

In the examples above where the drive system of the hull robot includes multiple drive elements, at least one of which being a cleaning track, the cleaning track may also be passively rotated as well. For example, the cleaning track may be independent of a drive system but may be enabled to rotate in one or more directions. The cleaning track can be configured to rotate freely to provide light cleaning functionality and minimal resistance to travel of the robot on the vessel hull. Alternately, the cleaning track can be configured with an amount of resistance to rotation (e.g., can be braked in various degrees) to provide greater friction or cleaning capabilities for removing fouling from the hull. In one aspect, the cleaning track can be configured to rotate in one direction and not in an opposite direction or to have greater resistance to rotation in one direction than another. Thus, for example, if the cleaning robot passes over an area of the hull and the hull at that area is determined to be insufficiently cleaned, the robot may move in reverse back over the area. In reverse, if the cleaning track is prevented from rotating or caused to rotate slower and with more friction than in the forward direction, the hull can be more thoroughly cleaned.

In accordance with one embodiment, the hull robot can be configured to switch between active and passive rotation of the cleaning track, to enable or disable rotation of the track in a specified direction, or to increase or decrease resistance to rotation, depending on the nature and/or extent of the hull fouling.

In another embodiment, the cleaning track may be a non-rotatable track (i.e., stationary). The cleaning track can thus provide a fixed cleaning element that functions as a scraper, for example, for cleaning the hull as the robot maneuvers about the hull. A stationary cleaning track may further comprise various protrusions in the form of scrapers, brushes, squeegees, etc. to aid in the cleaning function.

While many of the examples herein describe the cleaning element, cleaning track and the like as being a part of, formed with, or integral to a drive subsystem, in still other embodiments the cleaning element may also be independent of the drive subsystem (e.g., not part of the drive track). For example, non-rotating cleaning elements may be independent of the drive subsystem and facilitate the cleaning function for cleaning the hull of the vessel. Some non-limiting example non-rotating cleaning element types may include scrapers, squeegees, blades, brushes and so forth. Scrapers, blades and squeegees may be examples of non-rotating blade-like cleaning elements.

Figure 10A:
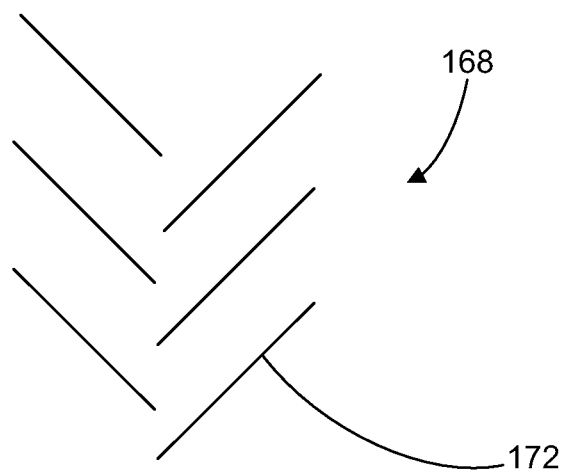
FIGS. 10a-10b are schematic diagrams of scraper configurations for use in cleaning a hull in accordance with the subject technology.

The non-rotating cleaning elements may extend towards the hull at least to a plane defined by a surface of the drive module in contact with the hull. The non-rotating cleaning element may be a rigid element (such as metal, for example) or flexible element (such as rubber, for example). In some examples, the non-rotating cleaning element may extend beyond a bottom surface of the robot body and/or beyond the plane defined by the surface of the drive module in contact with the hull. Flexible cleaning elements may be implemented when the cleaning element extends beyond a bottom surface of the robot body due to the ability to flex and bend to conform to the hull surface. The cleaning elements may be oriented to be substantially perpendicular to the hull surface (at least when not flexed or bent, as in the case of a flexible cleaning element), or may be at a non-perpendicular and non parallel angle between 0° and 90° with respect to the hull surface (or between 90° and 180°).

Where scrapers, squeegees, or the like are used to clean the hull, the hull robot and/or the cleaning track of the drive system in the hull robot may include a plurality of such devices. For example, as shown in FIG. 10a, an array 168 of scrapers 172 or squeegees may be provided to fully clean an area of the hull. The scrapers 172 can be supported about a drive element configured to provide a cleaning function. In another aspect, the scrapers 172 can be supported about an underside of the robot body, independent of the drive subsystem. The scrapers 172 can be passive scrapers, or they may be actuatable (e.g., by a motor) to translate in a given direction, travel about an arcuate path, etc.

Figure 10B:
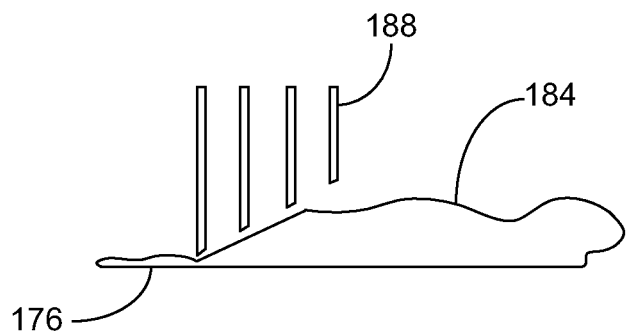

In another aspect shown in FIG. 10b, scrapers 188 can be positioned progressively closer to the hull 176 (e.g., at different elevations relative to the hull surface) towards the back end of the array such that the scraper most elevated off of the surface of the hull is the leading scraper in the direction of travel of the robot. In this configuration, the array of scrapers begins scraping off a top layer of the fouling 184, and as the robot advances, scrapes of material closer and closer to the hull as each of the successive scrapers in different elevations reaches a given point on the hull. In another example, an array of scrapers can have different hardness properties, such as a progressively increasing or decreasing hardness property, or staggered scrapers with different hardness properties. In still another example, the scrapers can be positioned in connected or separated v-shape patterns so as to direct scraped fouling towards an outside or middle of the robot (see FIG. 10a).

While some of the example cleaning devices described above have primarily discussed brushes, scrapers, and squeegees, any number of different cleaning elements in any combination may be used, with one or more cleaning elements being a part of the track and/or one or more separate cleaning elements within or supported about the hull robot body.

In using a cleaning track as part of the cleaning process, consideration may be given to effects on locomotion of the robot. For example, a counter-rotating cleaning track may provide some amount of resistance to the rotation of the locomotion track. Thus, the robot can be designed to account for this resistance by, for example, including a more powerful drive system, or allowing for greater time to clean the hull.

Some example cleaning systems or cleaning elements that may be used in combination with the cleaning functionality of the cleaning track include one or more pairs of counter-rotating brushes rotating in different directions. With squeegee/scraper type cleaning elements, blades can comprise different materials or stiffnesses depending upon the type or extent of bio-foul being cleaned. The squeegee/scraper type cleaning elements can be configured to rotate, to move laterally, or to oscillate. In these embodiments, it is useful to consider the angle of attack of the cleaning element on the hull so as to not damage the surface of hull or a surface finish. The squeegee/scraper type cleaning elements can be provided in layers of redundant or different combinations, such as with a hard element leading and a soft element trailing.

The cleaning robot can optionally include one or more brushes (e.g., roller brushes) or other cleaning elements that spin or rotate in the direction of travel of the hull robot, in a direction opposite the direction of travel, or in a direction transverse to the direction of travel (such as substantially perpendicular to the direction of travel, for example). In other words, the rotating cleaning element may rotate along an axis oriented parallel or transverse to a direction of travel, and the axis may for example, also be substantially parallel to the vessel hull surface to facilitate cleaning the hull. Thus, the cleaning element may rotate in the direction of travel or out of the direction of travel.

A drive system with a brush or cleaning element rotating the direction of travel can be simpler than with counter-rotating brushes. Further, with rotation in the direction of travel, the rotation of the cleaning element can assist somewhat in locomotion of hull robot. However, a counter-spinning roller brush can also be used, which may in some instances provide a more thorough cleaning at the expense of a more complex drive system and/or an increase in energy to drive the robot forward. In another aspect, roller brushes can be configured to rotate about an axis offset from the direction of travel (e.g., along an axis that is orthogonal or transverse to an axis parallel to the direction of travel).

Those skilled in the art will recognize that for cleaning heavily fouled hulls more powerful cleaning motors, more aggressive cleaning elements or assets (e.g., brushes, scrapers, etc.), and/or more thorough cleaning methods can be employed, each of which are contemplated herein. Scrapers, squeegees, blades and the like may be non-rotating elements or they may be rotating elements affixed about a rotational axis.

Figure 11:
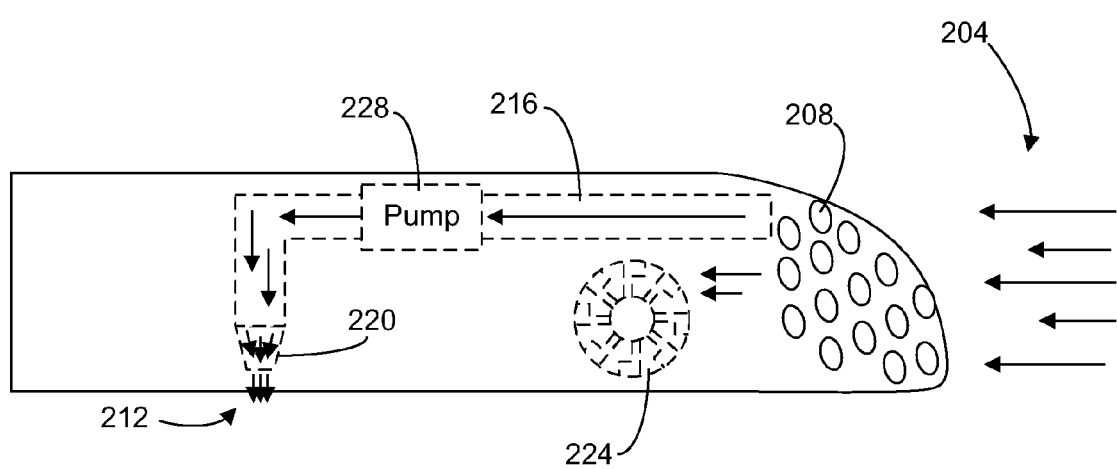
FIG. 11 is a side block diagram of a hull robot configured to redirect flowing fluid toward the hull surface for cleaning in accordance with the subject technology.

In some examples, such as illustrated in FIG. 11, a cleaning system and method can employ passing water 204. For example, the hull robot, and particularly the body of the hull robot, can include one or more intake ports 208 formed therein to receive and redirect passing water towards the hull. The ports may be selectively openable and closeable. For example, the ports may include a valve for opening and closing the port, or rather for admitting the flow of fluid through the port or blocking the flow of fluid through the port. The redirected passing water can be used to provide a high pressure fluid emission 212 that can also provide a cleaning function about the hull. For example, a port intake can be provided that facilitates water to flow into the robot at a particular volume and velocity. In fluid communication with the port(s) 208 can be one or more conduits, such as conduit 216, configured to redirect the water in some manner (e.g., towards the hull). The conduit 216 can be configured to narrow about an opening, thus causing the redirected fluid to increase in velocity. Fluid or water can be emitted from the conduit at such an increased velocity to perform one or more functions about the hull, such as a cleaning function. Furthermore, in some aspects, a nozzle 220 can be associated with the conduit 216 to further focus or direct the energy of the emitted water. The intake ports and nozzles can be optimized for speed, depending on the traveling speed of the vessel which is to be cleaned by the cleaning robot.

In one example, the use of passing water to clean the hull can be deployed after the vessel reaches a threshold speed. In this embodiment, the velocity and pressure of the emitted water will be proportional to the vessel speed. The threshold vessel speed can be determined by the use of a water wheel 224, turbine, or the like being rotated by the passing water. Alternatively, a pump 228 or series of pumps on-board the robot may be employed and associated with the ports, the fluid conduits, and/or the passing water, such that a minimum threshold vessel speed is not required to provide adequate water pressure and velocity to clean the hull. In a specific example, the concepts of passive cleaning after the vessel reaches a threshold speed and the use of pumps to actively pressurize water to clean the hull can be combined, such that the pumps are used below the threshold and passive redirection is used above the threshold. In another example, passing water can be used to achieve one level of pressure and active pumping can be used to increase the pressure as desired, no matter the speed of the vessel. An advantage of using water, passively or actively redirected towards the hull, is that there are no cleaning elements that need to be replaced, and thus no consumable devices.

In another example, a pump may be positioned within a fluid flow path beyond an energy extraction device or power scavenging device. For example, a pump may be supported by the robot body within the one or more conduits configured to redirect the fluid toward the hull surface for cleaning. The pump can be selectively actuated to increase the flow and pressure of the fluid within the conduit in accordance with the operating parameters of the pump.

In one aspect, the hull robot may be configured to position the robot body with respect to the direction of passing water to maximize the force of the passing water for cleaning the hull. In another aspect, the ports for receiving the passing water to be redirected can be mounted on a turret (see turret 200 of FIG. 9) and rotated to maximize the water intake.

Figure 12:
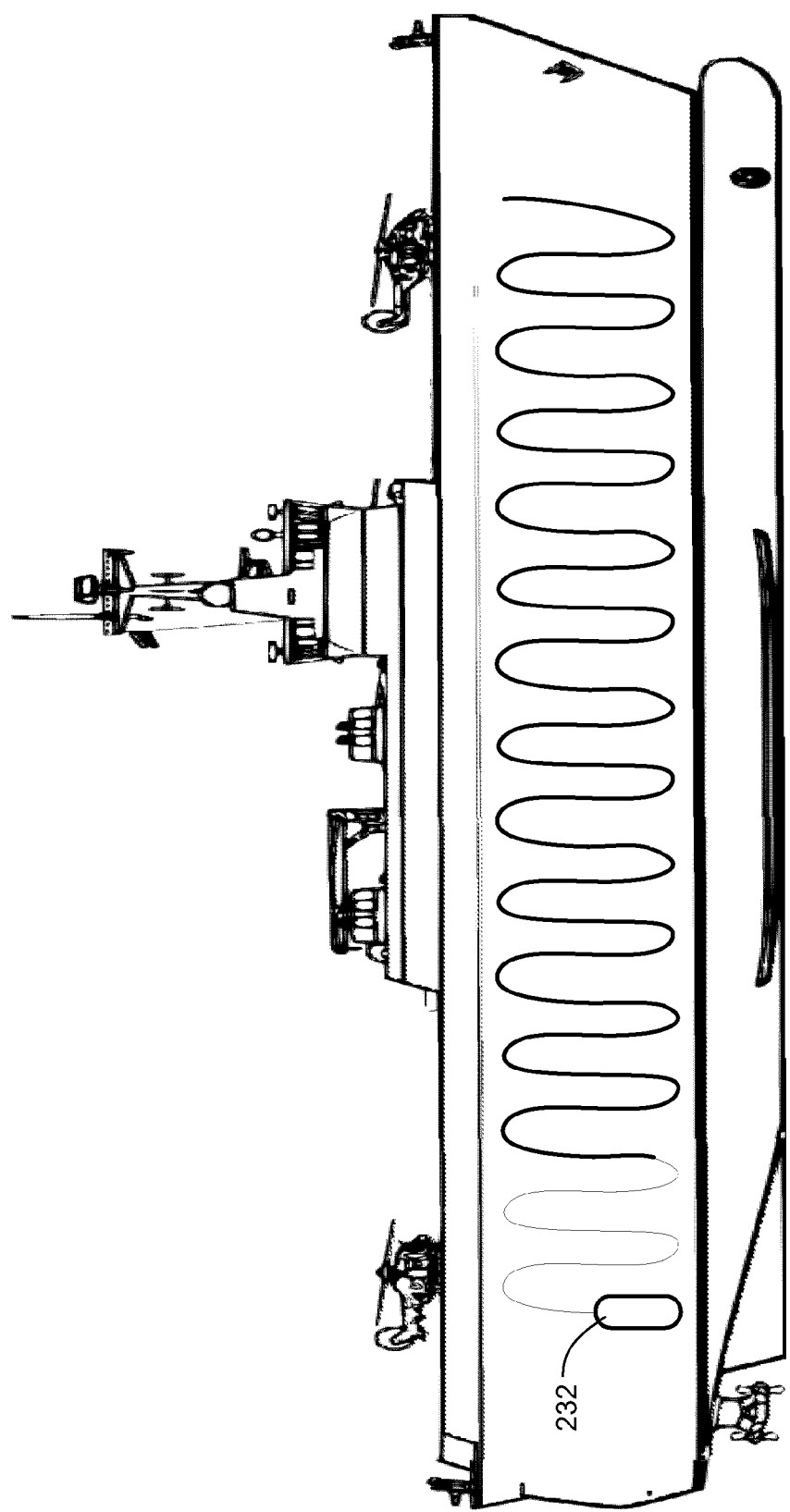
FIG. 12 is a schematic diagram of a hull robot navigating on a hull of a vessel in accordance with the subject technology.

In some examples, a navigation path of the robot may not be parallel with a direction of water flow and consideration of directional aspects of water intake may be of increased significance. As one example shown in FIG. 12, rather than navigating various horizontal paths along a length of the vessel being cleaned, the robot 232 can navigate about vertical paths on the hull of the vessel. Navigation along a horizontal path that is against the flow field can be difficult and/or require strong drive system components or significant energy. However, by orienting a navigation path of the robot vertically, energy can be conserved and smaller drive motors or other devices can be used. In a specific example of using vertical paths, the robot can be configured to navigate up and down and preferably from a front of the vessel towards a back of the vessel.

In implementations where the hull robot navigates along vertical paths, a shape or configuration of the hull robot may be configured for power scavenging, cleaning, and the like. In such implementations, hydrodynamics of the robot may be orthogonal (or at least offset at some angle) to a cleaning direction (i.e., the cleaning elements may clean in the direction of travel (e.g., in a vertical direction). The outer shell of the hull robot may comprise hydrodynamics that are tuned to be optimally efficient within the flow field, even in the event of vertical navigation.

In examples where the robot is intended to move up, down, and side to side, or where the robot may be configured to turn and face various different directions, the hull robot can be designed with a symmetrical robot body. With a symmetrical robot body, the robot can move and clean in any desired direction without consideration of which direction best aligns with the hydrodynamics of the robot body.

Figure 13:
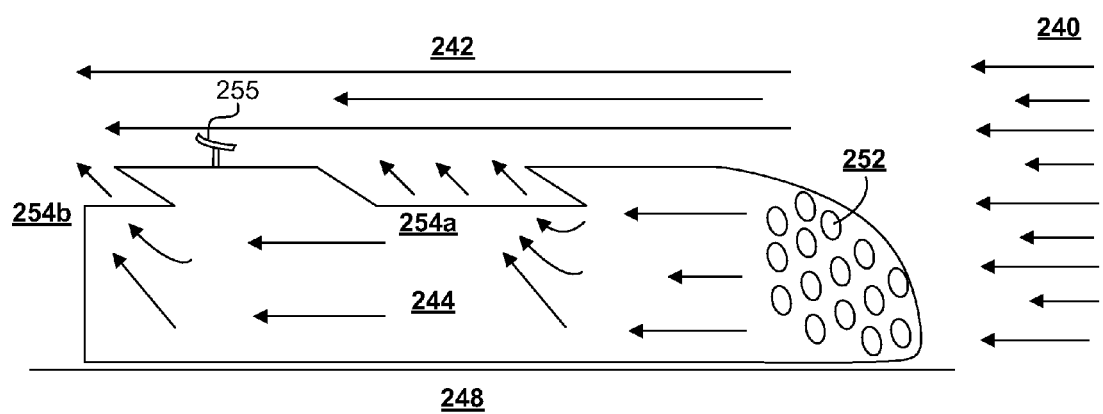
FIG. 13 is a side block diagram of a hull robot including outlet ports for creating low pressure areas to urge the robot against a hull in accordance with the subject technology.

In one aspect, as shown in FIG. 13, passing water can be used to assist in maintaining the hull robot 244 on the hull 248. The hull robot may be configured with a series of ports 252, 254*a*, 254*b* that receive passing water and that create a hydrodynamic force that urges the robot against the hull. Some of the ports (e.g., port 252) formed within the robot can be used to turn turbines and the like to power the robot, or power cleaning elements, as has been described above. However, the robot may be configured with other ports, such as low pressure ports 254*a*, 254*b*, that can provide outlets for water which flows into the robot, and which may generally not function as water intakes. Fluid flow 242 along the surface of the robot body can flow over the outlet ports 254*a*, 254*b* and create a low pressure area at the outlet that draws water from inside the robot out. Thus, the water pressure inside or under the robot can be reduced or lowered as compared with the water pressure on the outside or above of the robot body.

In other words, a low pressure condition can be created within or under the robot at compared to without or above the robot. This pressure differential generated effectively functions to urge the robot body and the robot against the hull, or to more aggressively attach the robot to the hull, or increase the force of attachment to the hull. The low pressure area facilitates suction against the hull surface to provide better adherence of the robot to the hull. A semi-vacuum or at least a low pressure state can thus be created within the hull robot about the hull surface of the vessel. A seal of the robot against the hull need not be perfect as the intent is to create a pressure difference or pressure differential to assist in securing the robot to the hull. As will be recognized by those skilled in the art, the low pressure ports can be located at various positions about the body of the robot. In addition, the robot may comprise any number of low pressure ports.

In one aspect, the low pressure ports may be part of a downforce generation system operable with the robot body to create a low pressure condition about the robot body and increase a downforce of the hull robot against the hull of the vessel. The downforce generation system may include inlet ports formed in the robot body for receiving a portion of fluid from passing fluid without the robot body to within the robot body. The low pressure ports may be outlet ports formed in the robot body for expelling the passing fluid from the robot body. The outlet ports may be in fluid communication with passing water without the robot body. The outlet ports may be formed in a side wall of the robot body at an angle transverse to the fluid receiving wall (i.e., where the inlet ports are located). The outlet ports may be operable to expel the passing fluid from the robot body. The outlet ports may also be recessed from a face of the side wall as shown in the drawing. The robot may be oriented about the hull such that the passing fluid flows in a first direction and the outlet ports are oriented to expel the passing fluid from the robot body in a second direction. For example, as shown in the drawing, the expelled fluid is expelled at an angle with respect to the passing fluid to assist in the expelled fluid being drawn into the passing fluid flow to reduce fluid pressure inside the robot. For example, the angle of the second direction (of the expelled fluid) may be at an angle with respect to the first direction (of the passing fluid) between 0° and 90°, or between 30° and 60°, or at approximately 45°.

The system may further include a pre-determined fluid flow path for the fluid within the robot body to be redirected to and expelled through the outlet ports. The downforce generation system may further include a hydrofoil 255 supported about the robot body to be in contact with passing water without the robot body. The hydrofoil may assist in urging the robot against the hull of the vessel. The hull robot with the downforce generation system may be created by providing a robot body as part of a hull robot and providing a downforce generation system operable with the robot body to create a low pressure condition about the robot body and increase a downforce of the hull robot against a hull of a vessel. The downforce generation system may be formed by forming one or more inlet ports in the robot body for receiving, within the robot body, a portion of fluid from passing fluid without the robot body and forming one or more outlet ports in the robot body for expelling the fluid from the robot body, the outlet ports being in fluid communication with the passing fluid without the robot body. The robot body of the hull robot may be formed to include a pre-determined fluid flow path within the robot body for redirecting and expelling the fluid through the outlet ports. The method of creating the downforce generation system may further include attaching at least one hydrofoil about the robot body to be in contact with passing fluid without the robot body, the hydrofoil being configured to further enhance the downforce of the robot body against the hull of the vessel.

The method for creating the hull robot with the downforce generation system may also include forming one or more inlet ports in a fluid receiving wall of the robot body for receiving, within the robot body, a portion of fluid from passing fluid without the robot body; and forming one or more outlet ports in a side wall of the robot body transverse to the fluid receiving wall, the outlet ports operable to expel the fluid from the robot body. The one or more outlet ports may be formed in a recessed configuration such that the outlet ports are recessed from a face of the side wall.

In an example method for at least partially securing a hull robot to a hull of a vessel, a hull robot may be positioned about a hull of a vessel in motion within a fluid (where the vessel in motion generates passing fluid relative to the hull). The hull robot may be operated about the hull of the vessel to cause a portion of fluid from the passing fluid to interact with a downforce generation system operable with and supported about a robot body of the hull robot, such that a low pressure condition is created about the robot body to increase a downforce of the hull robot against a hull of a vessel in increased.

The method may further include pumping the portion of fluid out through the one or more outlet ports by way of a pump in fluid communication with the fluid and the ports. Also, at least some of the portion of fluid within the robot body may be redirected toward the vessel hull surface to clean the vessel hull surface.

Figure 14:
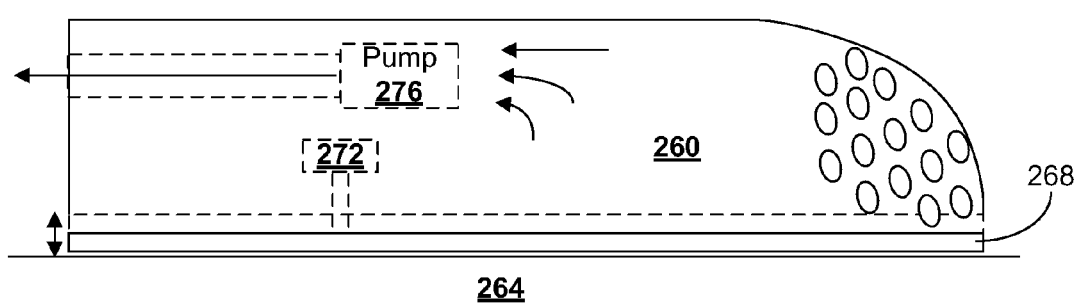
FIG. 14 is a side block diagram of a hull robot including a pump for creating at least a partial vacuum within the robot in accordance with the subject technology.

In another aspect illustrated in FIG. 14, the hull robot 260 may be more securely attached to the hull 264 using active suction fixation, wherein a pressure differential is created between a portion of the robot and pressure of the operating environment, the pressure differential being defined, at least in part, by a low or negative pressure condition existing within or about the robot and the hull of the vessel. In this example, the hull robot can utilize scavenged or battery power or passive water flow to further create a suction effect. The hull robot, and particularly the suction fixation system, may include a deployable skirt 268 or other structure that can be deployed against the hull using a motor 272 or gearing to create at least a partial seal against the hull. The suction fixation system may further comprise a negative pressure activator, which can be used once the skirt 268 is deployed to generate a low or negative pressure (i.e., a suction effect) within the robot and the skirt that helps to secure the robot to the hull. In one exemplary embodiment, the negative pressure activator can comprise a pump 276 that can be actuated to actively pump water from within the skirt to create the negative pressure condition.

Alternatively, instead of an active pump, the negative pressure activator can utilize passive water flowing about the robot to create the negative pressure condition or suction to achieve suction fixation of the robot against the hull of the vessel. In this embodiment, water flow can be directed over, and the negative pressure activator can comprise, one or more orifices formed in or about the body of the hull robot, and which are in fluid communication with the interior of the skirt as deployed. In one example embodiment, the one or more orifices may extend from an outer surface of the body of the hull robot and be in fluid communication with the interior portion of the skirt, such that a negative pressure is created as water passes over the one or more orifices. In another exemplary embodiment, passive water flow may be redirected through one or more ports formed in the robot body (similar to those described herein) and caused to pass over one or more orifices in fluid communication with the port(s) and the interior of the deployed skirt. In other words, the orifices for creating a negative pressure may not necessarily extend to the outer surfaces of the body of the full robot, but instead may be internal, such that water flow is caused to be redirected. Essentially, it is contemplated herein that various orifices may be positioned about or within the robot to facilitate creation of a negative pressure condition within the skirt and about the hull of the vessel to facilitate suction fixation of the robot to the hull. The negative pressure condition or suction fixation can also be used in combination with magnetic fixation, hydrodynamic force, or other means of securing the hull robot to the vessel hull to optimize adherence of the robot to the hull.

Figure 15:
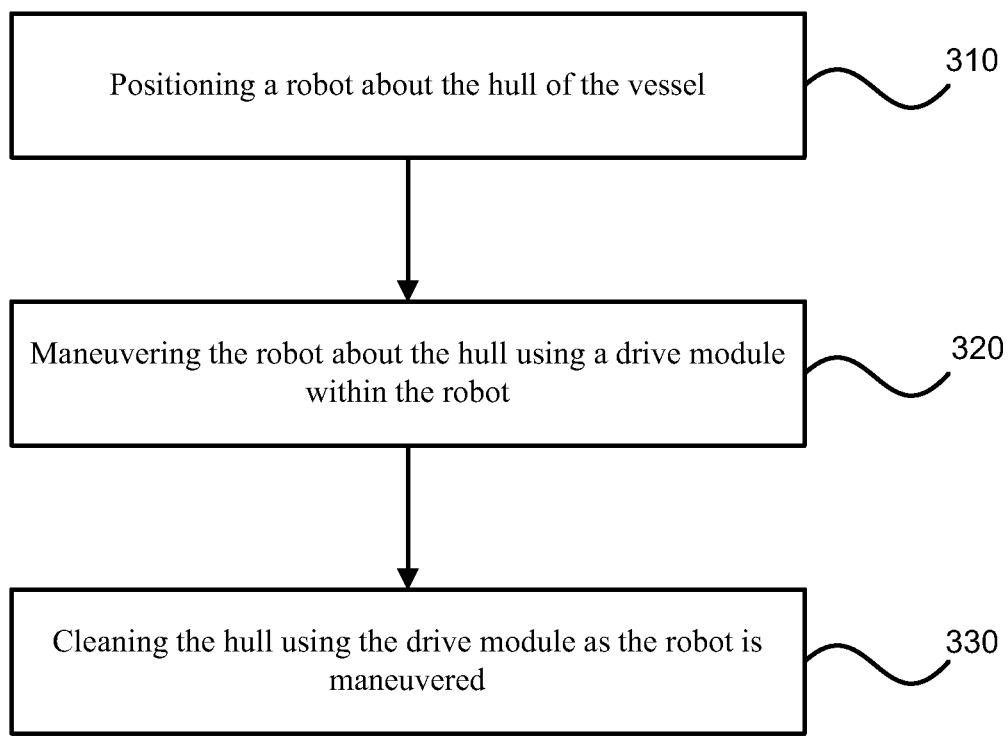
FIG. 15 is a flow diagram of a method of cleaning a hull of a vessel in accordance with the subject technology.

Referring now to FIG. 15, a flow diagram of a method of cleaning a hull of a vessel is illustrated in accordance with an embodiment of the present technology. The method comprises positioning 310 a robot about the hull of the vessel and maneuvering 320 the robot about the hull using a drive module within the robot. The method further includes cleaning 330 the hull using the drive module as the robot is maneuvered.

In one aspect, the method may include operating the vessel within a fluid so as to generate a fluid flow relative to the hull of the vessel. The hull robot may be secured about the hull of the vessel and may operate during movement of the vessel.

Maneuvering the robot about the hull using the drive module within the robot may comprise maneuvering the robot about the hull while the vessel is moving within a body of fluid.

Maneuvering the robot about the hull using the drive module within the robot may further comprise maneuvering the robot along a substantially vertical path transverse to a flow of fluid about the vessel.

Cleaning the hull can include redirecting fluid in which the vessel is moving towards the hull using the robot as the fluid flows past the robot.

The method can further include creating a reduced fluid pressure within the robot as compared to a fluid pressure without the robot to urge the robot against the hull. As one example, the reduced fluid pressure can be created using a pump to pump fluid from within the robot to without the robot.

Cleaning the hull according to the method may comprise rotating different tracks of the drive module at different speeds or in different directions, where at least two tracks of the drive module comprise different materials.

Cleaning the hull according to the method may comprise scraping the hull with a plurality of scrapers having different hardness properties.

Various aspects of the robot or cleaning methods may be implemented using sensors, processors, logic devices, and so forth. For example, the cleanliness detection system may use a processor to compare a current hull cleanliness with a clean hull state to determine whether and to what extent fouling is present on the hull. Based on the results of the comparison, the cleaning system may be operated to more thoroughly or less thoroughly clean the hull, such as by changing oscillation speed of the cleaning track, changing a distance, pressure, or orientation of a scraper with respect to the hull, changing the pressure of water redirected towards the hull and so forth.

For example, the method can further include detecting a cleanliness parameter of the portion of the hull using a detector. The detected cleanliness parameter can be compared with a stored cleanliness parameter to obtain a cleanliness differential. The method can include determining whether the cleanliness differential is within an acceptable, pre-determined cleanliness range. The method can include analyzing the degree of the cleanliness differential to determine whether to initiate a cleaning routine or operation. The cleaning routine can be initiated when the cleanliness differential is greater than a predetermined amount. The cleaning routine can be discontinued as desired, or when the cleanliness differential is reduced to be below an acceptable threshold or to be within an acceptable range. The cleaning routine can be a closed-loop cycle where the cleaning operation is performed until the threshold is reached by sensing the level of cleanliness of the hull even during the cleaning operation. Thus, rather than simply identifying that the cleanliness differential is above the acceptable threshold and performing the cleaning routine and moving on to a next location of the hull, the hull cleaning robot can monitor the cleanliness of a current area of the hull and continue cleaning until the cleaning objective is reached, or the cleanliness differential is reduced to an acceptable level. The degree of cleanliness can be determined continuously during cleaning, at periodic intervals during cleaning, or at the end of a cleaning operation to determine whether to continue, resume, and/or restart the cleaning routine until the hull is sufficiently clean.

In one aspect, a velocity threshold may exist for passing fluid to actuate drive subsystems, cleaning subsystems, energy extraction devices and so forth. A velocity of passing fluid may be a result of the vessel to which the hull robot is attached being in motion at a velocity meeting or exceeding a pre-determined velocity or the velocity threshold. In the context of cleaning routines, for example, power provided for cleaning operations or for determining a degree of cleanliness may be dependent on the flow of fluid as the vessel moves through the fluid. If there is no fluid flow or the fluid flow fails to meet or exceed the velocity threshold, cleaning operations and detection of a degree of cleanliness may be paused or halted until there is a sufficient fluid flow or a fluid flow which meets or exceeds the velocity threshold.

The methods and systems of certain examples may be implemented in hardware, software, firmware, or combinations thereof. The methods disclosed herein can be implemented as software or firmware that is stored in a memory and that is executed by a suitable instruction execution system (e.g., a processor). If implemented in hardware, the methods disclosed herein can be implemented with any suitable technology that is well known in the art.

Also within the scope of this disclosure is the implementation of a program or code that can be stored in a non-transitory machine-readable medium to permit a computer or processor to perform any of the methods described above.

Some of the functional units described in this specification have been labeled as modules, in order to more particularly emphasize their implementation independence. The various modules, engines, tools, etc., discussed herein may be, for example, software, firmware, commands, data files, programs, code, instructions, or the like, and may also include suitable mechanisms. For example, a module may be implemented as a hardware circuit comprising custom VLSI (very large scale integration) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Various aspects of the drawings are simplified to facilitate illustration of particular features of the present technology. The drawings are also not necessarily drawn to scale.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

The invention claimed is:

1. A hull cleaning robot, comprising:
   a robot body; and
   at least one drive module within the robot body for maneuvering the robot about a hull, the at least one drive module comprising at least one drive element configured to hold the robot on the hull as the robot maneuvers about the hull; and
   a pump configured to actively pump water out of the robot and create a low pressure condition between the robot and the hull that urges the robot against the hull, wherein the at least one drive element facilitates at least one cleaning function for cleaning the hull of a vessel.

2. The robot of claim 1, wherein the at least one drive element is configured to oscillate relative to the hull as the robot maneuvers about the hull to provide the at least one cleaning function.

3. The robot of claim 1, wherein the at least one drive element comprises at least two drive elements configured to travel in a different direction relative to one another.

4. The robot of claim 1, wherein the at least one drive element comprises at least two drive elements formed of different materials than one another.

5. The robot of claim 1, wherein the at least one drive element comprises at least two drive elements that rotate at different speeds.

6. The robot of claim 1, wherein the at least one drive element comprises at least two drive elements that rotate in different directions.

7. The robot of claim 1, wherein the drive element further comprises at least one cleaning element supported thereon to facilitate the cleaning function.

8. The robot of claim 7, wherein the cleaning element comprises one or more squeegees, one or more scrapers, one or more brushes, one or more pads, and any combination of these.

9. The robot of claim 1, further comprising one or more ports formed in the robot body, and one or more fluid conduits in fluid communication with the one or more ports, wherein passing fluid is received through the ports and redirected by the fluid conduits to be emitted at a higher pressure from the one or more fluid conduits and directed at the hull to facilitate the cleaning function.

10. The robot of claim 9, further comprising a pump operable with the one or more fluid conduits to further pressurize the fluid directed at the hull.

11. The robot of claim 1, wherein the at least one drive element is configured to oscillate relative to the hull at ultrasonic frequencies as the robot maneuvers about the hull to provide the at least one cleaning function.

12. A method of cleaning a hull of a vessel, comprising:
    positioning a robot about the hull of the vessel;
    maneuvering the robot about the hull using a drive module within the robot;
    operating the drive module in a manner to effectuate cleaning of the hull, wherein the drive module provides a cleaning function; and
    creating a low pressure condition within the robot as compared to without the robot to increase a force of attachment of the robot to the hull.

13. The method of claim 12, wherein maneuvering the robot about the hull using the drive module within the robot comprises maneuvering the robot about the hull while the vessel is moving within a body of fluid.

14. The method of claim 12, wherein maneuvering the robot about the hull using the drive module within the robot further comprises maneuvering the robot along a substantially vertical path transverse to a flow of fluid past the vessel.

15. The method of claim 12, further comprising redirecting fluid in which the vessel is moving towards the hull as the fluid flows past the robot to facilitate cleaning of the hull.

16. The method of claim 12, wherein creating the low pressure condition comprises using a pump to pump fluid from within the robot to without the robot.

17. The method of claim 12, wherein operating the drive module comprises rotating different drive elements of the drive module at different speeds or in different directions, at least two drive elements of the drive module comprising different materials.

18. The method of claim 12, further comprising scraping the hull with a plurality of scrapers having different hardness properties to facilitate cleaning of the hull.

19. A hull cleaning robot, comprising:
    a robot body; and
    at least one drive module within the robot body for maneuvering the robot about a hull, the at least one drive module comprising:
        at least one drive element configured to hold the robot on the hull as the robot maneuvers about the hull, and to facilitate locomotion; and
        at least one drive element comprising cleaning functionality and operable to move relative to the hull to facilitate cleaning of the hull as the robot maneuvers about the hull,
        wherein the drive elements rotate in at least one of a different direction and a different speed relative to one another.

20. A hull robot comprising:
    a robot body;
    one or more ports formed in the robot body for receiving passing fluid;
    one or more fluid conduits in fluid communication with the one or more ports, wherein the fluid conduits are configured to redirect the passing fluid received through the ports toward the hull; and an energy extraction device in fluid communication with the one or more fluid conduits, wherein at least one pump is in between the energy extraction device and the fluid one or more conduits.

21. The hull robot of claim 20, further comprising a nozzle operable with the one or more fluid conduits, wherein the nozzle is configured to cause the redirected fluid to be emitted at a higher pressure from the one or more fluid conduits to facilitate a cleaning function about the hull.

22. The hull robot of claim 20, further comprising at least one pump operable to further pressurize the passing fluid.

23. The hull robot of claim 20, wherein the ports are selectively openable and closeable.

24. A hull robot comprising:
a suction fixation system operable to help adhere the hull robot to a hull of a vessel, the suction fixation system comprising:
a deployable skirt configured to be deployed against a vessel hull to create at least a partial seal against the hull; and
a negative pressure activator operable to create a low pressure area within an area defined by the skirt, wherein a suction effect is created between the robot and the hull.

25. The hull robot of claim 24, wherein the negative pressure activator comprises a pump operable to actively pump water from within the skirt.

26. The hull robot of claim 24, wherein the negative pressure activator comprises one or more orifices formed in the robot in fluid communication with an interior portion of the skirt, such that passing water over the orifices creates the suction effect.

27. The hull robot of claim 26, wherein the one or more orifices are formed in an external surface of the robot.

28. The hull robot of claim 26, wherein the negative pressure activator further comprises one or more ports formed in the robot, and one or more orifices in fluid communication with the one or more ports and the interior portion of the skirt, wherein passive water flow within the one or more ports is redirected over the one or more orifices to create the suction effect.

29. A hull cleaning robot, comprising:
a robot body;
at least one drive module supported by the robot body for maneuvering the robot about a hull of a vessel, the at least one drive module comprising at least one drive element configured to at least partially secure the robot to the hull as the robot maneuvers about the hull; and
an ultrasonic cleaning element configured to oscillate relative to the hull at ultrasonic frequencies as the robot maneuvers about the hull to provide a cleaning function for cleaning the hull of a vessel.

30. The hull cleaning robot of claim 29, wherein the ultrasonic cleaning element is powered by energy extracted from a flow of fluid resulting from motion of the vessel within the fluid.

31. A method of cleaning a hull of a vessel, comprising:
operating a vessel within a fluid so as to generate a fluid flow relative to a hull of the vessel; securing a hull robot about the hull of the vessel;
maneuvering the hull robot about the hull using a drive module supported within the hull robot; and
operating an ultrasonic cleaning element configured to oscillate relative to the hull at ultrasonic frequencies as the robot maneuvers about the hull to provide a cleaning function.

32. The method of claim 31, wherein operating the ultrasonic cleaning element comprises powering the ultrasonic cleaning element with energy extracted from the fluid flow.

33. A hull robot, comprising:
a robot body;
a downforce generation system operable with the robot body to create a low pressure condition about the robot body and increase a downforce of the hull robot against a hull of a vessel, wherein the downforce generation system comprises:
one or more inlet ports formed in a fluid receiving wall of the robot body for receiving, within the robot body, a portion of fluid from passing fluid without the robot body; and
one or more outlet ports formed in a side wall of the robot body transverse to the fluid receiving wall, the outlet ports operable to expel the passing fluid from the robot body, and wherein the outlet ports are recessed from a face of the side wall.

34. The hull robot of claim 33, wherein the downforce generation system comprises:
one or more inlet ports formed in the robot body for receiving, within the robot body, a portion of fluid from passing fluid without the robot body;
one or more outlet ports formed in the robot body for expelling the passing fluid from the robot body, the outlet ports being in fluid communication with passing water without the robot body; and
a pre-determined fluid flow path, wherein the fluid within the robot body is redirected to and expelled through the outlet ports.

35. The hull robot of claim 33, wherein the downforce generation system comprises at least one hydrofoil supported about the robot body to be in contact with passing water without the robot body.

36. The hull robot of claim 33, wherein the passing fluid flows in a first direction and the outlet ports are oriented to expel the passing fluid from the robot body in a second direction.

37. The hull robot of claim 36, wherein the second direction is at an angle with respect to the first direction between 0° and 90°.

38. The hull robot of claim 36, wherein the second direction is at an angle with respect to the first direction between 30° and 60°.

39. The hull robot of claim 33, wherein the downforce generation system further comprises at least one hydrofoil supported about the robot body to be in contact with passing water without the robot body.

40. A method of creating a hull robot, comprising:
providing a robot body as part of a hull robot;
providing a downforce generation system operable with the robot body to create a low pressure condition about the robot body and increase a downforce of the hull robot against a hull of a vessel;
forming one or more inlet ports in a fluid receiving wall of the robot body for receiving, within the robot body, a portion of fluid from passing fluid without the robot body; and
forming one or more outlet ports in a side wall of the robot body transverse to the fluid receiving wall, the outlet ports operable to expel the fluid from the robot body, wherein forming the one or more outlet ports comprises forming the one or more outlets ports in a recessed configuration such that the outlet ports are recessed from a face of the side wall.

41. The method of claim 40, wherein providing the downforce generation system comprises:
- forming one or more inlet ports in the robot body for receiving, within the robot body, a portion of fluid from passing fluid without the robot body; and
- forming one or more outlet ports in the robot body for expelling the fluid from the robot body, the outlet ports being in fluid communication with the passing fluid without the robot body,
- wherein the robot body comprises a pre-determined fluid flow path within the robot body for redirecting and expelling the fluid through the outlet ports.

42. The hull robot of claim 40, further comprising attaching at least one hydrofoil about the robot body to be in contact with passing fluid without the robot body, the hydrofoil being configured to further enhance the downforce of the robot body against the hull of the vessel.

43. A hull robot, comprising:
- a subsystem;
- a direct drive system operable to at least partially power the subsystem, and comprising a power scavenging device;
- an electric motor operable to at least partially power the subsystem; and
- a power supply operable to provide power to the electric motor,
- wherein the hull robot is operable within passing water generated by a vessel in motion, and
- wherein, when in operation with the passing water having a velocity above a velocity threshold as generated by the vessel in motion above a pre-determined threshold speed, the direct drive system supplements power output of the motor to at least reduce a power demand on the motor from the subsystem to operate the subsystem.

44. The hull robot of claim 43, wherein the subsystem comprises a cleaning subsystem to clean a hull of a vessel to which the hull robot is attachable.

45. The hull robot of claim 43, wherein the subsystem comprises a drive subsystem to drive and maneuver the hull robot about a hull of a vessel to which the hull robot is attachable.

46. The hull robot of claim 43, wherein the direct drive system is sufficiently sized and configured to completely power the subsystem and eliminate the power demand on the motor from the subsystem when the hull robot is operated in the passing water having a velocity above the velocity threshold as generated by a vessel in motion above a pre-determined threshold speed.

47. The hull robot of claim 46, further comprising a submersion detection device to detect whether the hull robot is submersed in the passing water.

48. The hull robot of claim 43, wherein the direct drive system further comprises a transmission to generate a desired torque for operation of the subsystem.

49. The hull robot of claim 43, wherein the direct drive system further comprises a governor to limit operation of the subsystem.

50. The hull robot of claim 43, wherein the direct drive system is operable with the power supply to charge the power supply.

51. The hull robot of claim 43, wherein the subsystem comprises a cleaning subsystem including a brush, and the direct drive system comprises a water wheel directly coupled to the brush to rotate the brush against the hull of the vessel.

52. A method for operating a hull robot, comprising:
- detecting whether the hull robot is submersed in passing fluid resulting from a vessel in motion;
- operating a subsystem of the hull robot using a motor when the hull robot is not submersed in the passing fluid, or when submersed in fluid having a velocity below a velocity threshold; and
- operating the subsystem of the hull robot using, at least in part, a direct drive system when the hull robot is submersed in the passing fluid having a velocity above the velocity threshold.

53. The method of claim 52, further comprising operating the subsystem of the hull robot using both the motor and the direct drive system when the hull robot is submersed in the passing fluid having a velocity above the velocity threshold.

54. The method of claim 52, wherein operating the subsystem comprises operating a drive subsystem to drive and maneuver the hull robot about a hull of the vessel.

55. The method of claim 53, wherein operating the subsystem comprises operating a cleaning subsystem to clean a hull of the vessel.

* * * * *